United States Patent
Kapoor et al.

(10) Patent No.: US 10,146,536 B2
(45) Date of Patent: *Dec. 4, 2018

(54) METHOD AND APPARATUS FOR PERFORMING LOGICAL COMPARE OPERATIONS

(71) Applicant: Intel Corporation, Santa Clara, CA (US)

(72) Inventors: Rajiv Kapoor, University Place, WA (US); Ronen Zohar, Sunnyvale, CA (US); Mark Buxton, Chandler, AZ (US); Zeev Sperber, Zichron Yaakov (IL); Koby Gottlieb, Kiryat Tivon (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/885,269

(22) Filed: Jan. 31, 2018

(65) Prior Publication Data

US 2018/0181395 A1    Jun. 28, 2018

Related U.S. Application Data

(63) Continuation of application No. 15/345,221, filed on Nov. 7, 2016, now Pat. No. 9,898,285, which is a
(Continued)

(51) Int. Cl.
*G06F 9/30* (2018.01)
*G06F 7/02* (2006.01)
(Continued)

(52) U.S. Cl.
CPC .......... *G06F 9/30021* (2013.01); *G06F 7/026* (2013.01); *G06F 9/3001* (2013.01);
(Continued)

(58) Field of Classification Search
CPC ............ G06F 9/30036; G06F 9/30058; G06F 9/3016; G06F 9/30021; G06F 12/0875
(Continued)

(56) References Cited

U.S. PATENT DOCUMENTS

| 4,648,059 A | 3/1987 | Gregorcyk |
| 5,029,069 A | 7/1991 | Sakamura |

(Continued)

FOREIGN PATENT DOCUMENTS

| CN | 1219253 A | 6/1999 |
| CN | 1469241 A | 1/2004 |

(Continued)

OTHER PUBLICATIONS

"AltiVec Instruction Reference", available at http://developer.apple.com/hardwaredrivers/ve/instructioncrossref.html Gwenapp L., "AltiVec Vectorizes PowerPC", Microprocessor Report, vol. 12, No. 6, 1988.
(Continued)

*Primary Examiner* — Tan V Mai
(74) *Attorney, Agent, or Firm* — Nicholson De Vos Webster & Elliott LLP

(57) ABSTRACT

A method and apparatus for including in a processor instructions for performing logical-comparison and branch support operations on packed or unpacked data. In one embodiment, instruction decode logic decodes instructions for an execution unit to operate on packed data elements including logical comparisons. A register file including 128-bit packed data registers stores packed single-precision floating point (SPFP) and packed integer data elements. The logical comparisons may include comparison of SPFP data elements and comparison of integer data elements and setting at least one bit to indicate the results. Based on these comparisons, branch support actions are taken. Such branch support actions may include setting the at least one bit, which in turn
(Continued)

may be utilized by a branching unit in response to a branch instruction. Alternatively, the branch support actions may include branching to an indicated target code location.

10 Claims, 17 Drawing Sheets

Related U.S. Application Data continuation of application No. 15/015,991, filed on Feb. 4, 2016, now Pat. No. 9,489,198, which is a continuation of application No. 14/684,412, filed on Apr. 12, 2015, now Pat. No. 9,268,565, which is a continuation of application No. 13/763,598, filed on Feb. 8, 2013, now Pat. No. 9,037,627, which is a continuation of application No. 13/082,726, filed on Apr. 8, 2011, now Pat. No. 8,380,780, which is a continuation of application No. 11/525,706, filed on Sep. 21, 2006, now Pat. No. 7,958,181.

(51) Int. Cl.
*G06F 9/38* (2018.01)
*G06F 12/0875* (2016.01)

(52) U.S. Cl.
CPC ........ *G06F 9/3016* (2013.01); *G06F 9/30029* (2013.01); *G06F 9/30036* (2013.01); *G06F 9/30058* (2013.01); *G06F 9/30094* (2013.01); *G06F 9/30098* (2013.01); *G06F 9/30145* (2013.01); *G06F 9/30149* (2013.01); *G06F 9/3887* (2013.01); *G06F 12/0875* (2013.01); *G06F 2212/452* (2013.01)

(58) Field of Classification Search
USPC .............................. 708/490, 671; 340/146.2
See application file for complete search history.

(56) References Cited

U.S. PATENT DOCUMENTS

| | | | |
|---|---|---|---|
| 5,408,670 | A | 4/1995 | Davies |
| 5,748,515 | A | 5/1998 | Glass et al. |
| 5,802,336 | A | 9/1998 | Peleg et al. |
| 5,838,984 | A | 11/1998 | Nguyen et al. |
| 5,907,842 | A | 5/1999 | Mennemeier et al. |
| 5,959,874 | A | 9/1999 | Lin et al. |
| 6,036,350 | A | 3/2000 | Mennemeier et al. |
| 6,128,614 | A | 10/2000 | Mennemeier et al. |
| 6,317,824 | B1 | 11/2001 | Thakkar et al. |
| 7,809,932 | B1 | 10/2010 | Barry et al. |
| 8,301,604 | B1 | 10/2012 | Anker et al. |
| 9,898,285 | B2 * | 2/2018 | Kapoor ............... G06F 9/30021 |
| 2004/0039900 | A1 | 2/2004 | Heishi et al. |
| 2015/0106591 | A1 | 4/2015 | Julier et al. |

FOREIGN PATENT DOCUMENTS

| | | |
|---|---|---|
| EP | 0463975 A2 | 1/1992 |
| JP | H08328849 A | 12/1996 |
| JP | H10116268 A | 5/1998 |
| JP | H10512070 A | 11/1998 |
| JP | H1124293 A | 1/1999 |
| JP | H11511575 A | 10/1999 |
| JP | 2001229135 A | 8/2001 |
| JP | 2005174298 A | 6/2005 |
| JP | 6014338 B2 | 10/2016 |
| KR | 200152537 Y1 | 7/1999 |
| WO | 9617291 A1 | 6/1996 |
| WO | 9617292 A1 | 6/1996 |
| WO | 2008036946 A1 | 3/2008 |

OTHER PUBLICATIONS

Apple Develop Connection, "AltiVec Instruction Cross-Reference," 2005, pp. 1-8.
Corrected Notice of Allowance from U.S. Appl. No. 13/082,726, dated Dec. 26, 2012, 7 pages.
Corrected Notice of Allowance from U.S. Appl. No. 13/763,596, dated Oct. 8, 2015, 2 pages.
First Office Action from foreign counterpart Chinese Patent Application No. CN20071144187, dated Mar. 27, 2009, 28 pages.
Freescale Semiconductor, "High-Performance Processors, AltiVec(TM) Technology," 2004, pp. 1-4.
Frey, et al., "PowerPC User Instruction Set Architecture—Book1 Version 2.02," Sep. 2003, IBM, Chapter 3.3.9 (pp. 60-61), Chapter 4.6.7 (p. 119) and Appendix B (pp. 156-157).
Gwenapp, "AltiVec Vectorizes PowerPC, Forthcoming Multimedia Extensions Improve on MMX", Microprocessor Report, vol. 12, No. 6, May 11, 1998, pp. 1-5.
IA-31 Intel Architecture Software Developer's manual, vol. 2: Instruction Set Reference, 2003, pp. 811-812 (Test Logical Compare instruction).
Intel Corporation, "Intel 64 and IA-32 Architectures Software Developer's Manual vol. 2B Instruction Set Reference N-Z," Nov. 2006, pp. i, ii and 4-372 through 4-374.
International Preliminary Report on Patentability for Application No. PCT/US2007/079235, dated Mar. 24, 2009, 6 pages.
International Search Report and Written Opinion for Application No. PCT/US2007/079235, dated Jan. 16, 2008, 9 pages.
Non-final Office Action from U.S. Appl. No. 11/525,706, dated Sep. 15, 2010, 16 pages.
Non-final Office Action from U.S. Appl. No. 13/082,726, dated Jul. 9, 2012, 8 pages.
Non-final Office Action from U.S. Appl. No. 13/656,636, dated Aug. 18, 2014, 13 pages.
Non-final Office Action from U.S. Appl. No. 13/763,596, dated Aug. 18, 2014, 13 pages.
Non-final Office Action from U.S. Appl. No. 13/763,598, dated Aug. 19, 2014, 13 pages.
Non-final Office Action from U.S. Appl. No. 13/843,236, dated Aug. 19, 2014, 10 pages.
Non-final Office Action from U.S. Appl. No. 14/684,412, dated Jun. 25, 2015, 12 pages.
Non-final Office Action from U.S. Appl. No. 15/015,991, dated Apr. 5, 2016, 10 pages.
Non-final Office Action from U.S. Appl. No. 15/345,221 dated Apr. 12, 2017, 7 pages.
Notice of Allowance from U.S. Appl. No. 11/525,706, dated Jan. 11, 2011, 8 pages.
Notice of Allowance from U.S. Appl. No. 13/656,634, dated Jul. 19, 2013, 14 pages.
Notice of Allowance from U.S. Appl. No. 13/656,636, dated Apr. 1, 2015, 9 pages.
Notice of Allowance from U.S. Appl. No. 13/656,636, dated Dec. 15, 2014, 5 pages.
Notice of Allowance from U.S. Appl. No. 13/763,596, dated Dec. 3, 2014, 5 pages.
Notice of Allowance from U.S. Appl. No. 13/763,596, dated Mar. 17, 2015, 8 pages.
Notice of Allowance from U.S. Appl. No. 13/763,598, dated Dec. 9, 2014, 5 pages.
Notice of Allowance from U.S. Appl. No. 13/763,598, dated Mar. 18, 2015, 8 pages.
Notice of Allowance from U.S. Appl. No. 13/843,236, dated Dec. 9, 2014, 5 pages.
Notice of Allowance from U.S. Appl. No. 13/843,236, dated Mar. 18, 2015, 8 pages.
Notice of Allowance from U.S. Appl. No. 14/684,412, dated Nov. 18, 2015, 5 pages.
Notice of Allowance from U.S. Appl. No. 15/015,991, dated Jul. 13, 2016, 5 pages.
Notice of Allowance from U.S. Appl. No. 15/345,221, dated Jun. 30, 2017, 5 pages.

(56) References Cited

OTHER PUBLICATIONS

Notice of Allowance from U.S. Appl. No. 15/345,221, dated Oct. 19, 2017, 13 pages.
Notice of Reason(s) for Rejection from foreign counterpart Japanese Patent Application No. 2016-255721, dated Feb. 6, 2018, 6 pages.
Office Action form foreign counterpart Korean Application No. 2009-7005715, dated Nov. 30, 2010, 6 pages.
Office action from foreign counterpart German Patent Application No. 102007045187, dated Aug. 5, 2009, 16 pages.
"PowerPC User Instruction Set Architecture—Book 1—Version 2.01," Sep. 2003, Chapters 3.3.9 and 4.6.7 and Appendix B, section B.5.
Ramanathan, et al., "Extending the World's Most Popular Processor Architecture," (White Paper) Intel corporation, Sep. 2006, 8 pages. downloaded from http://www.download.intel.com/technology/architecture/new-instructions-paper.pdf.
Ramanathan R M., et al., "Extending the World's Most Popular Processor Architecture," Intel Corporation, Oct. 2006, pp. 1-8.
Second Office Action from foreign counterpart Chinese Patent Application No. 2007101441872, dated Sep. 11, 2009, 6 pages.
Shipnes J, "Graphics Processing with the 88110 RISC Microprocessor," IEEE Computer Society International Conference, Digest of Papers, Feb. 24-28, 1992, pp. 169-174.
Zhongying, "Principles of Computer Architecture," Science Press, 2002, pp. 153-163.
Notice of Allowance from U.S. Appl. No. 13/082,726, dated Oct. 26, 2012, 5 pages.
First Examination Report from foreign counterpart Indian Patent Application No. 609/DELNP/2009, dated Dec. 29, 2015, 2 pages.
Decision to Refuse from foreign counterpart Japanese Patent Application No. 2016-162358, dated Aug. 30, 2018, 9 pages.
Notice of Reason(s) for Rejection from foreign counterpart Japanese Patent Application No. 2016-255721, dated May 22, 2018, 5 pages.

\* cited by examiner

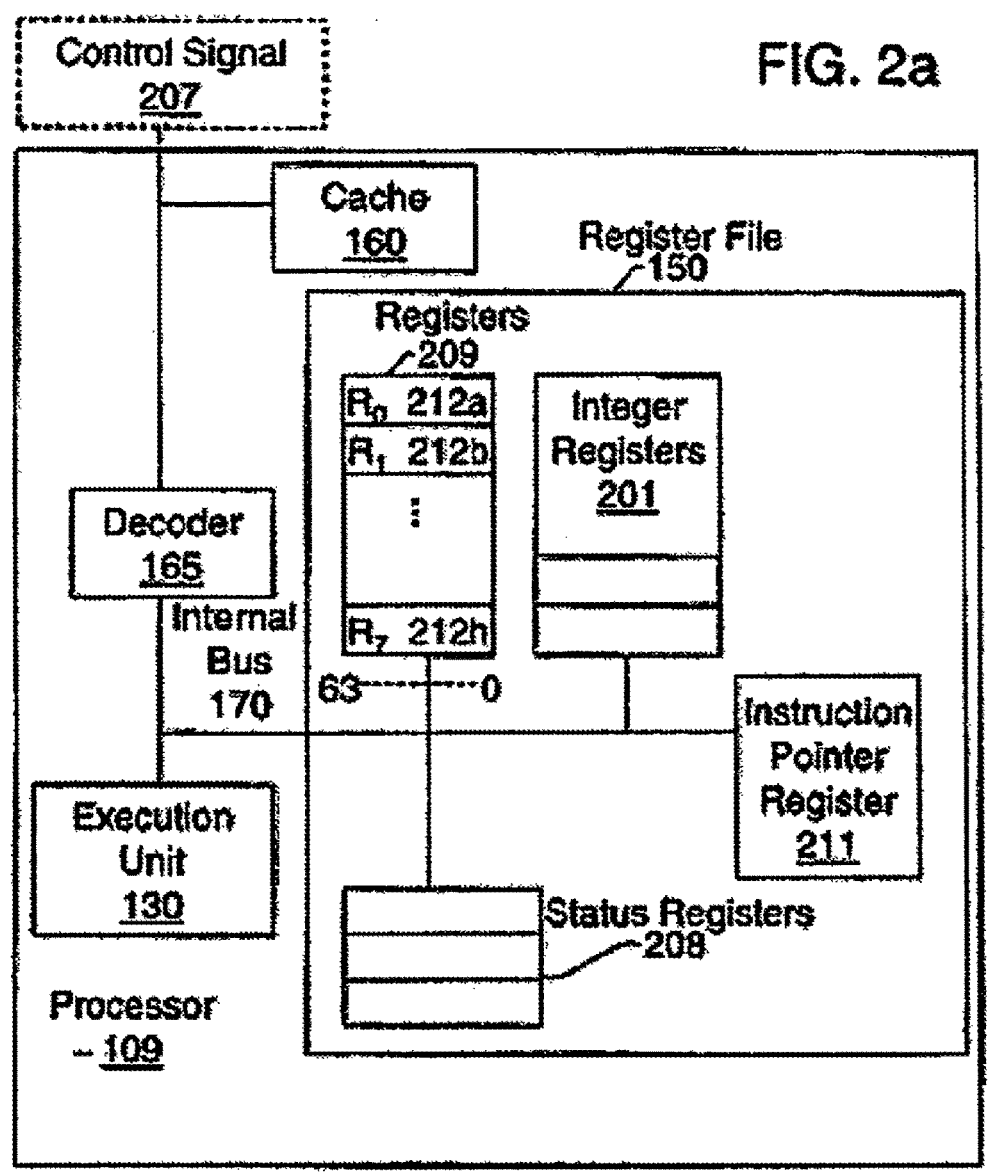

| 127 | 96 95 | | 64 63 | | 32 31 | | 0 |
|---|---|---|---|---|---|---|---|
| bbbb... | ...bbbb | bbbb... | ...bbbb | bbbb... | ...bbbb | bbbb... | ...bbbb |

Unsigned packed doubleword in-register representation 514

| 127 | 96 95 | | 64 63 | | 32 31 | | 0 |
|---|---|---|---|---|---|---|---|
| sbbb... | ...bbbb | sbbb... | ...bbbb | sbbb... | ...bbbb | sbbb... | ...bbbb |

Signed packed doubleword in-register representation 515

| 127 | | | 64 63 | | | | 0 |
|---|---|---|---|---|---|---|---|
| bbbb... | ...bbbb | bbbb bbbb | bbbb... | bbbb... | ...bbbb | bbbb bbbb | bbbb... |

Unsigned packed quadword in-register representation 516

| 127 | | | 64 63 | | | | 0 |
|---|---|---|---|---|---|---|---|
| sbbb... | ...bbbb | bbbb bbbb | bbbb... | sbbb... | ...bbbb | bbbb bbbb | bbbb... |

Signed packed quadword in-register representation 517

*FIG. 6*

METHOD AND APPARATUS FOR PERFORMING LOGICAL COMPARE OPERATIONS

CROSS REFERENCE TO RELATED APPLICATIONS

This application is a continuation of U.S. patent application Ser. No. 15/345,221, filed Nov. 7, 2016, which is a continuation of U.S. patent application Ser. No. 15/015,991, filed Feb. 4, 2016, now U.S. Pat. No. 9,489,198, issued on Nov. 8, 2016, which is a Continuation of U.S. patent application Ser. No. 14/684,412, filed Apr. 12, 2015, now U.S. Pat. No. 9,268,565, Issued on Feb. 23, 2016, which is a Continuation of U.S. patent application Ser. No. 13/763,598, filed Feb. 8, 2013, now U.S. Pat. No. 9,037,627, which is a Continuation of U.S. patent application Ser. No. 13/082,726, filed Apr. 8, 2011, now U.S. Pat. No. 8,380,780, which is a Continuation of U.S. patent application Ser. No. 11/525,706, filed Sep. 21, 2006, now U.S. Pat. No. 7,958,181, all of which is hereby incorporated by reference.

FIELD OF THE INVENTION

This disclosure relates generally to the field of processors. In particular, the disclosure relates to using a single control signal to perform multiple logical compare operations on multiple bits of data.

BACKGROUND OF THE INVENTION

In typical computer systems, processors are implemented to operate on values represented by a large number of bits (e.g., 64) using instructions that produce one result. For example, the execution of an add instruction will add together a first 64-bit value and a second 64-bit value and store the result as a third 64-bit value. Multimedia applications (e.g., applications targeted at computer supported cooperation (CSC—the integration of teleconferencing with mixed media data manipulation), 2D/3D graphics, image processing, video compression/decompression, recognition algorithms and audio manipulation) require the manipulation of large amounts of data. The data may be represented by a single large value (e.g., 64 bits or 128 bits), or may instead be represented in a small number of bits (e.g., 8 or 16 or 32 bits). For example, graphical data may be represented by 8 or 16 bits, sound data may be represented by 8 or 16 bits, integer data may be represented by 8, 16 or 32 bits, and floating point data may be represented by 32 or 64 bits.

To improve efficiency of multimedia applications (as well as other applications that have the same characteristics), processors may provide packed data formats. A packed data format is one in which the bits typically used to represent a single value are broken into a number of fixed sized data elements, each of which represents a separate value. For example, a 128-bit register may be broken into four 32-bit elements, each of which represents a separate 32-bit value. In this manner, these processors can more efficiently process multimedia applications.

BRIEF DESCRIPTION OF THE DRAWINGS

The present invention is illustrated by way of example and not limitation in the figures of the accompanying drawings.

FIGS. 2a-2b illustrate register files of processors according to alternative embodiments of the invention.

FIG. 4 illustrates packed data types according to alternative embodiments of the invention.

FIG. 5 illustrates in-register packed byte and in-register packed word data representations according to at least one embodiment of the invention.

FIG. 6 illustrates in-register packed doubleword and in-register packed quadword data representations according to at least one embodiment of the invention.

DETAILED DESCRIPTION

Figure 1A:
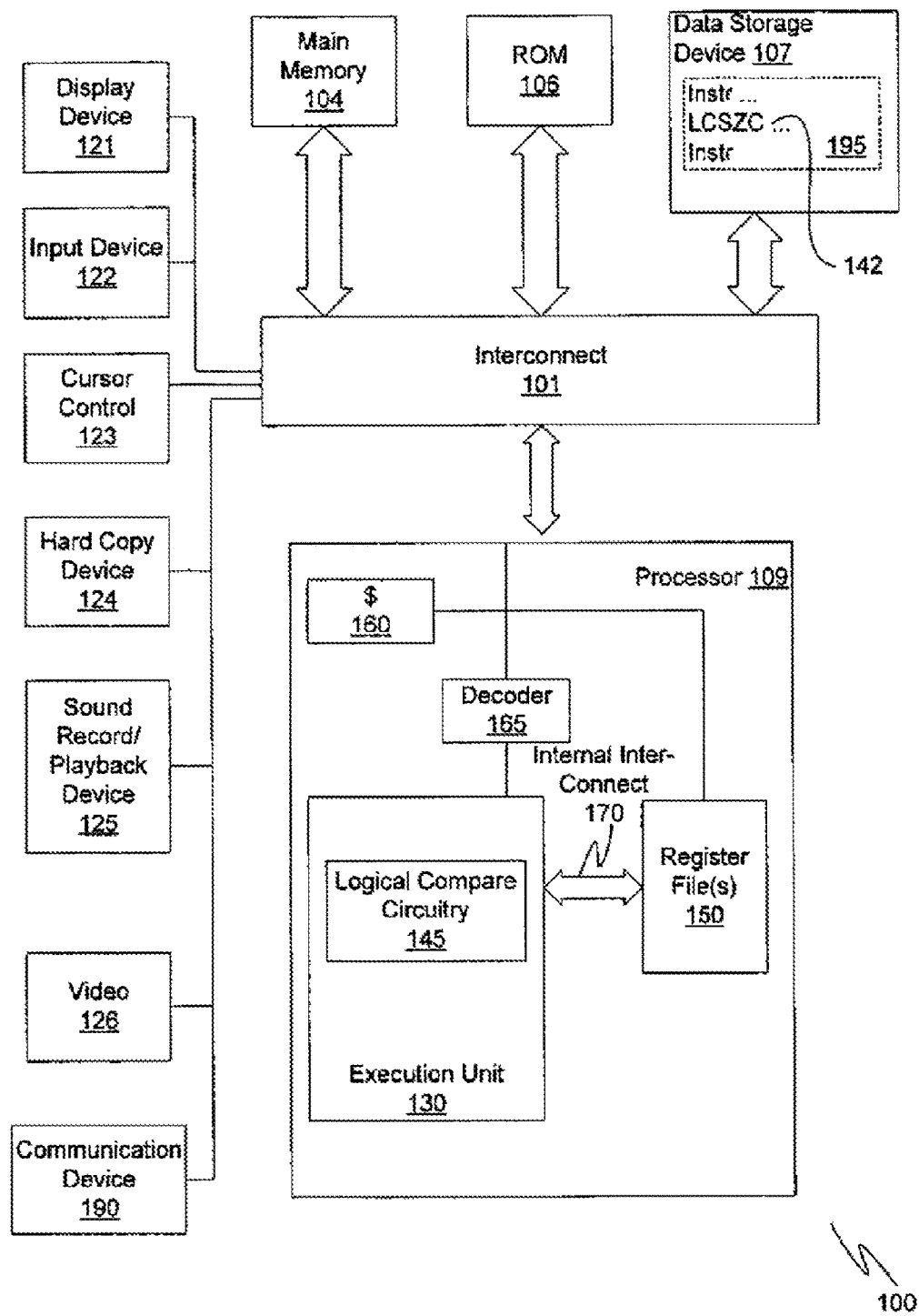
FIGS. 1a-1c illustrate example computer systems according to alternative embodiments of the invention.

Disclosed herein are embodiments of methods, systems and circuits for including in a processor instructions for performing logical compare operations on multiple bits of data in response to a single control signal. The data involved in the logical compare operations may be packed or unpacked data. For at least one embodiment, a processor is coupled to a memory. The memory has stored therein a first datum and a second datum. The processor performs logical compare operations on data elements in the first datum and the second datum in response to receiving an instruction. The logical compare operations may include a bitwise AND of data elements in the first and second datum and may also include a bitwise AND of the complement of data elements of the first datum with data elements of the second datum. At least two status flags of the processor are modified based on the results of the logical compare operations. These two status flags may include the zero flag and the carry flag. These flags may be architecturally visible to application programs, and may be part of a larger flag value, such as an architecturally visible extended flags (EFLAGS) register.

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims.

Definitions

To provide a foundation for understanding the description of the embodiments of the invention, the following definitions are provided.

Bit X through Bit Y:

defines a subfield of binary number. For example, bit six through bit zero of the byte $00111010_2$ (shown in base two) represent the subfield $111010_2$. The '2' following a binary number indicates base 2. Therefore, $1000_2$ equals $8_{10}$, while $F_{16}$ equals $15_{10}$.

$R_X$: is a register. A register is any device capable of storing and providing data. Further functionality of a register is described below. A register is not necessarily, included on the same die or in the same package as the processor.

SRC and DEST:
  identify storage areas (e.g., memory addresses, registers, etc.)

Source1-$i$ and Result1-$i$ and Destin: represent data.

Overview

This application describes embodiments of methods, apparatuses and systems for including in a processor instructions for logical compare operations on packed or unpacked data. More specifically, the instructions may be for logically comparing data and then setting the zero and carry flags based on the comparisons. For at least one embodiment, two logical compare operations are performed using a single instruction as shown below in Table 1a and Table 1b. The compare operations include a bit-wise logical AND of the destination and source operands, as well as a bit-wise logical AND of the complement of the destination operand with the source operand. Table 1a shows a simplified representation of one embodiment of the disclosed logical compare operations, while Table 1b shows a bit-level example of an embodiment of the disclosed logical compare instructions, given some sample values. For the embodiments illustrated in Tables 1a and 1b, the data in the source and destination operand may be of any data representation and is not necessarily packed data, though it could be packed data. Where the data of the source and/or destination operands is a single entity of 128-bits, and therefore is not considered "packed" data, it will be referred to herein as "unpacked" data, which simply means that the data is not necessarily subdivided into component representations and may be considered a single data value. While the data in Table 1a is represented, for simplicity of illustration, as a 32-bit value, one of skill in the art will recognize that the concept being illustrated in Tables 1a and 1b may be applied to data of any length, including smaller data lengths (e.g., 4-bit, 8-bit, and 16-bit lengths) as well as larger data lengths (e.g., 64-bit and 128-bit lengths).

TABLE 1a

| Logical Compare Dest, Source | |
| --- | --- |
| Destination Operand | Dest |
| Source Operand | Source |
| Dest AND (bitwise) Source | Int. Result1 |
| [NOT Dest] AND (bitwise) Source | Int. Result2 |
| Set if Int. Result1 = all 0's; otherwise reset | Zero Flag |
| Set if Int. Result2 = all 0's; otherwise reset | Carry Flag |

TABLE 1b

| Logical Compare Dest, Source - Example Values |
| --- |
| Destination Operand |
| 10101010010101010000111100000000 |
| Source Operand |
| 01010101101010101111000000001111 |
| Dest AND (bitwise) Source |
| 00000000000000000000000000000000 |
| [NOT Dest] AND Source |
| 01010101101010101111000000001111 |
| ZERO FLAG = TRUE |
| CARRY FLAG = FALSE |

For at least one embodiment, the data values for the source and destination operands may represent packed data. Each of the packed components of the source and destination operands for such embodiment may represent any type of data.

Tables 2a and 2b illustrate that components $A_1$ through $A_4$ and $B_1$ through $B_4$ each represent binary representations of 32-bit single-precision floating point numbers. However, such illustration should not be taken to be limiting. One of skill in the art will recognize that each of the components may represent any data, including any integral or floating point data format, as well as string format or any other type of data format.

TABLE 2a

| Logical Compare Dest, Source | | | | |
| --- | --- | --- | --- | --- |
| $A_1$ | $A_2$ | $A_3$ | $A_4$ | Dest |
| $B_1$ | $B_2$ | $B_3$ | $B_4$ | Source |
| Dest AND (bitwise) Source | | | | Int. Result1 |
| [NOT Dest] AND (bitwise) Source | | | | Int. Result2 |
| Set if Int. Result1 = all 0's; otherwise reset | | | | Zero Flag |
| Set if Int. Result2 = all 0's; otherwise reset | | | | Carry Flag |

TABLE 2b

| Logical Compare Dest, Source - Example Values | |
| --- | --- |
| A1: −118.625 | A2: 0.15625 |
| 11000010111011010100000000000000 | 00111110001000000000000000000000 |
| B1: −0.0 | B2: 0.0 |
| 10000000000000000000000000000000 | 00000000000000000000000000000000 |
| A1 AND B1 | A2 AND B2 |
| 10000000000000000000000000000000 | 00000000000000000000000000000000 |
| [NOT A1] AND B1 | [NOT A2] AND B2 |
| 00000000000000000000000000000000 | 00000000000000000000000000000000 |
| ZERO FLAG = FALSE | |
| CARRY FLAG = TRUE | |
| A3: −2.125 | A4: 2.5 |
| 11000000000010000000000000000000 | 01000000000100000000000000000000 |

TABLE 2b-continued

Logical Compare Dest, Source - Example Values

| | |
|---|---|
| B3: −0.0 | B4: 0.0 |
| 10000000000000000000000000000000 | 00000000000000000000000000000000 |
| A3 AND B3 | A4 AND B4 |
| 10000000000000000000000000000000 | 00000000000000000000000000000000 |
| [NOT A3] AND B3 | [NOT] A4 AND B4 |
| 00000000000000000000000000000000 | 00000000000000000000000000000000 |
| ZERO FLAG = FALSE | |
| CARRY FLAG = TRUE | |

For packed embodiments, such as that illustrated by Tables 2a and 2b, alternative embodiments may be employed such that only certain bits of each packed element are operated upon during the compare operation. For example, at least some such alternative embodiments are discussed below in connection with the discussion of FIGS. 7c, 7d, 8b, and 8c.

One of skill in the art will recognize that intermediate values "Int. Result1" and "Int. Result2" are shown in Tables 1a and 2a and that the third and fourth rows of binary values are show in Tables 1b and 2b for ease of illustration only. Their representation in Tables 1a through 2b should not be taken to imply that such intermediate values are necessarily stored within the processor, although they may be so stored for at least one embodiment. Alternatively, for at least one other embodiment, such intermediate values are determined via circuitry without storing said values in a storage area.

Tables 1a, 1b, 2a and 2b, above, describe embodiments of a "logical compare, set zero and carry flags" ("LCSZC") instruction that performs a bitwise AND operation on each of the 128 bits of the source and destination operands, and also performs a bitwise AND operation of each of the 128 bits of the source operand with each of the 128 bits of the complemented value of the destination operand, and sets the zero and carry flags according to the results of the AND operations.

The setting of the zero and carry flags supports branching behavior based on the logical comparisons. For at least one embodiment, the LCSZC instruction may be followed by a separate branch instruction that indicates the desired branching operation to be performed by the processor, base on the value of one or both of the flags (see, e.g., pseudocode in Table 4, below). One of skill in art will recognize that setting of status flags are not the only hardware mechanism by which branching operations may utilize the comparison results, and other mechanisms may be implemented in order to support branching based on the results of the comparisons. Thus, although specific embodiments described below indicate that zero and carry flags may be set as a result of the logical comparison, such flag-setting in support of branching is not required for all embodiments. Accordingly, the term "LCSZC" as used herein should not be taken to be limiting, in that the setting of the zero and carry flags is not necessary for all embodiments.

For one alternative embodiment, for example, the branching behavior may be performed as a direct result of a variant of the LCSZC instruction that fuses the comparison and branching in one instruction, such as fused "test-and-branch" instruction. For at least one embodiment of the fused "test-and-branch" instruction, no status flag is set as a result of the logical comparisons performed.

Alternative embodiments may vary the number of bits in the data elements and the intermediate results. Also, alternative embodiments may compare only some bits of the respective source and destination values. In addition, alternative embodiment may vary the number of data elements used and the number of intermediate results generated. For example, alternative embodiments may include but are not limited to: a LCSZC instruction for an unsigned source and a signed destination; a LCSZC instruction for a signed source and an unsigned destination; a LCSZC instruction for an unsigned source and an unsigned destination; and a LCSZC instruction for a signed source and a signed destination. In each of the examples, said source and destination may each contain packed data of 8-bit, 16-bit, 32-bit, or 64-bit components. Alternatively, said source and destination data is not packed, but is instead a 128-bit data element. The packed nature of the source and destination need not be symmetric, and the size of data for the source and destination, if both are packed, need not necessarily be the same.

Computer System

FIG. 1a illustrates an example computer system 100 according to one embodiment of the invention. Computer system 100 includes an interconnect 101 for communicating information. The interconnect 101 may include a multi-drop bus, one or more point-to-point interconnects, or any combination of the two, as well as any other communications hardware and/or software.

FIG. 1a illustrates a processor 109, for processing information, coupled with interconnect 101. Processor 109 represents a central processing unit of any type of architecture, including a CISC or RISC type architecture.

Computer system 100 further includes a random access memory (RAM) or other dynamic storage device (referred to as main memory 104), coupled to interconnect 101 for storing information and instructions to be executed by processor 109. Main memory 104 also may be used for storing temporary variables or other intermediate information during execution of instructions by processor 109.

Computer system 100 also includes a read only memory (ROM) 106, and/or other static storage device, coupled to interconnect 101 for storing static information and instructions for processor 109. Data storage device 107 is coupled to interconnect 101 for storing information and instructions.

FIG. 1a also illustrates that processor 109 includes an execution unit 130, a register file 150, a cache 160, a decoder 165, and an internal interconnect 170. Of course, processor 109 contains additional circuitry that is not necessary to understanding the invention.

Decoder 165 is for decoding instructions received by processor 109 and execution unit 130 is for executing instructions received by processor 109. In addition to recognizing instructions typically implemented in general purpose processors, decoder 165 and execution unit 130 recognize instructions, as described herein, for performing logical-compare-and-set-zero-and-carry-flags (LCSZC)

operations. The decoder 165 and execution unit 130 recognize instructions for performing LCSZC operations on both packed and unpacked data.

Execution unit 130 is coupled to register file 150 by internal interconnect 170. Again, the internal interconnect 170 need not necessarily be a multi-drop bus and may, in alternative embodiments, be a point-to-point interconnect or other type of communication pathway.

Register file(s) 150 represents a storage area of processor 109 for storing information, including data. It is understood that one aspect of the invention is the described instruction embodiments for performing LCSZC operations on packed or unpacked data. According to this aspect of the invention, the storage area used for storing the data is not critical. However, embodiments of the register file 150 are later described with reference to FIGS. 2a-2b Execution unit 130 is coupled to cache 160 and decoder 165. Cache 160 is used to cache data and/or control signals from, for example, main memory 104. Decoder 165 is used for decoding instructions received by processor 109 into control signals and/or microcode entry points. These control signals and/or microcode entry points may be forwarded from the decoder 165 to the execution unit 130.

In response to these control signals and/or microcode entry points, execution unit 130 performs the appropriate operations. For example, if an LCSZC instruction is received, decoder 165 causes execution unit 130 to perform the required comparison logic. For at least some embodiments (such as those not implementing fused "test and branch" operations), the execution unit 130 may set the zero and carry flags accordingly (see, e.g., logical compare circuitry 145). For such embodiments, a branch unit (not shown) of the processor 109 may utilize the flags during execution of a subsequent branch instruction that indicates a target code location.

Alternatively, the execution unit 130 itself may include branch circuitry (not shown) that effects a branch based on the logical comparisons. For such embodiment, "branching support" provided by an LCSZC instruction is a control jump to a specified target code location, rather than the setting of control flags. For at least one embodiment, the branch circuitry that performs the jump, or "branch", may be part of the logical compare circuitry 145).

Decoder 165 may be implemented using any number of different mechanisms (e.g., a look-up table, a hardware implementation, a PLA, etc.). Thus, while the execution of the various instructions by the decoder 165 and execution unit 130 may be represented herein by a series of if/then statements, it is understood that the execution of an instruction does not require a serial processing of these if/then statements. Rather, any mechanism for logically performing this if/then processing is considered to be within the scope of the invention.

FIG. 1a additionally shows a data storage device 107 (e.g., a magnetic disk, optical disk, and/or other machine readable media) can be coupled to computer system 100. In addition, the data storage device 107 is shown to include code 195 for execution by the processor 109. The code 195 can include one or more embodiments of an LCSZC instruction 142, and can be written to cause the processor 109 to perform bit testing with the LCSZC instruction(s) 142 for any number of purposes (e.g., motion video compression/decompression, image filtering, audio signal compression, filtering or synthesis, modulation/demodulation, etc.).

Computer system 100 can also be coupled via interconnect 101 to a display device 121 for displaying information to a computer user. Display device 121 can include a frame buffer, specialized graphics rendering devices, a liquid crystal display (LCD), and/or a flat panel display.

An input device 122, including alphanumeric and other keys, may be coupled to interconnect 101 for communicating information and command selections to processor 109. Another type of user input device is cursor control 123, such as a mouse, a trackball, a pen, a touch screen, or cursor direction keys for communicating direction information and command selections to processor 109, and for controlling cursor movement on display device 121. This input device typically has two degrees of freedom in two axes, a first axis (e.g., x) and a second axis (e.g., y), which allows the device to specify positions in a plane. However, this invention should not be limited to input devices with only two degrees of freedom.

Another device that may be coupled to interconnect 101 is a hard copy device 124 which may be used for printing instructions, data, or other information on a medium such as paper, film, or similar types of media. Additionally, computer system 100 can be coupled to a device for sound recording, and/or playback 125, such as an audio digitizer coupled to a microphone for recording information. Further, the device 125 may include a speaker which is coupled to a digital to analog (D/A) converter for playing back the digitized sounds.

Computer system 100 can be a terminal in a computer network (e.g., a LAN). Computer system 100 would then be a computer subsystem of a computer network. Computer system 100 optionally includes video digitizing device 126 and/or a communications device 190 (e.g., a serial communications chip, a wireless interface, an ethernet chip or a modem, which provides communications with an external device or network). Video digitizing device 126 can be used to capture video images that can be transmitted to others on the computer network.

For at least one embodiment, the processor 109 supports an instruction set that is compatible with the instruction set used by existing processors (such as, e.g., the Intel® Pentium® Processor, Intel® Pentium® Pro processor, Intel® Pentium® II processor, Intel® Pentium® III processor, Intel® Pentium® 4 Processor, Intel® Itanium® processor, Intel® Itanium® 2 processor, or the Intel® Core™ Duo processor) manufactured by Intel Corporation of Santa Clara, Calif. As a result, processor 109 can support existing processor operations in addition to the operations of the invention. Processor 109 may also be suitable for manufacture in one or more process technologies and by being represented on a machine readable media in sufficient detail, may be suitable to facilitate said manufacture. While the invention is described below as being incorporated into an x86 based instruction set, alternative embodiments could incorporate the invention into other instruction sets. For example, the invention could be incorporated into a 64-bit processor using an instruction set other than the x86 based instruction set.

Figure 1B:
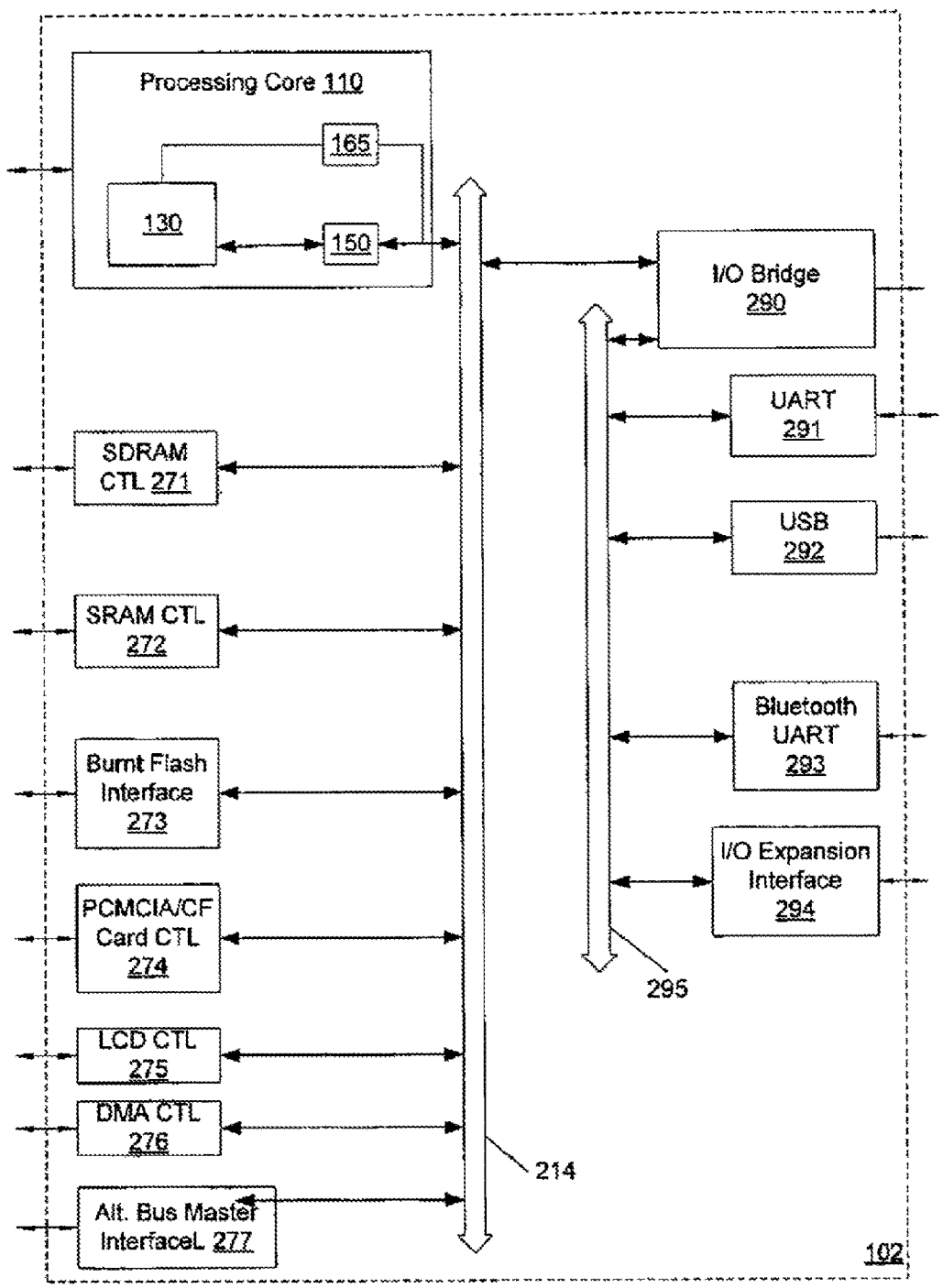

FIG. 1b illustrates an alternative embodiment of a data processing system 102 that implements the principles of the present invention. One embodiment of data processing system 102 is an applications processor with Intel XScale™ technology. It will be readily appreciated by one of skill in the art that the embodiments described herein can be used with alternative processing systems without departure from the scope of the invention.

Computer system 102 comprises a processing core 110 capable of performing LCSZC operations. For one embodiment, processing core 110 represents a processing unit of any type of architecture, including but not limited to a CISC, a RISC or a VLIW type architecture. Processing core 110 may also be suitable for manufacture in one or more process technologies and by being represented on a machine readable media in sufficient detail, may be suitable to facilitate said manufacture.

Processing core 110 comprises an execution unit 130, a set of register file(s) 150, and a decoder 165. Processing core 110 also includes additional circuitry (not shown) which is not necessary to the understanding of the present invention.

Execution unit 130 is used for executing instructions received by processing core 110. In addition to recognizing typical processor instructions, execution unit 130 recognizes instructions for performing LCSZC operations on packed and unpacked data formats. The instruction set recognized by decoder 165 and execution unit 130 may include one or more instructions for LCSZC operations, and may also include other packed instructions.

Execution unit 130 is coupled to register file 150 by an internal bus (which may, again, be any type of communication pathway including a multi-drop bus, point-to-point interconnect, etc.). Register file 150 represents a storage area of processing core 110 for storing information, including data. As previously mentioned, it is understood that the storage area used for storing the data is not critical. Execution unit 130 is coupled to decoder 165. Decoder 165 is used for decoding instructions received by processing core 110 into control signals and/or microcode entry points. In response to these control signals and/or microcode entry points. These control signals and/or microcode entry points may be forwarded to the execution unit 130. The execution unit 130 may perform the appropriate operations, responsive to receipt of the control signals and/or microcode entry points. For at least one embodiment, for example, the execution unit 130 may perform the logical comparisons described herein and may also set the status flags as discussed herein or branch to a specified code location, or both.

Processing core 110 is coupled with bus 214 for communicating with various other system devices, which may include but are not limited to, for example, synchronous dynamic random access memory (SDRAM) control 271, static random access memory (SRAM) control 272, burst flash memory interface 273, personal computer memory card international association (PCMCIA)/compact flash (CF) card control 274, liquid crystal display (LCD) control 275, direct memory access (DMA) controller 276, and alternative bus master interface 277.

For at least one embodiment, data processing system 102 may also comprise an I/O bridge 290 for communicating with various I/O devices via an I/O bus 295. Such I/O devices may include but are not limited to, for example, universal asynchronous receiver/transmitter (UART) 291, universal serial bus (USB) 292, Bluetooth wireless UART 293 and I/O expansion interface 294. As with the other buses discussed above, I/O bus 295 may be any type of communication pathway, include a multi-drop bus, point-to-point interconnect, etc.

At least one embodiment of data processing system 102 provides for mobile, network and/or wireless communications and a processing core 110 capable of performing LCSZC operations on both packed and unpacked data. Processing core 110 may be programmed with various audio, video, imaging and communications algorithms including discrete transformations, filters or convolutions; compression/decompression techniques such as color space transformation, video encode motion estimation or video decode motion compensation; and modulation/demodulation (MODEM) functions such as pulse coded modulation (PCM).

Figure 1C:
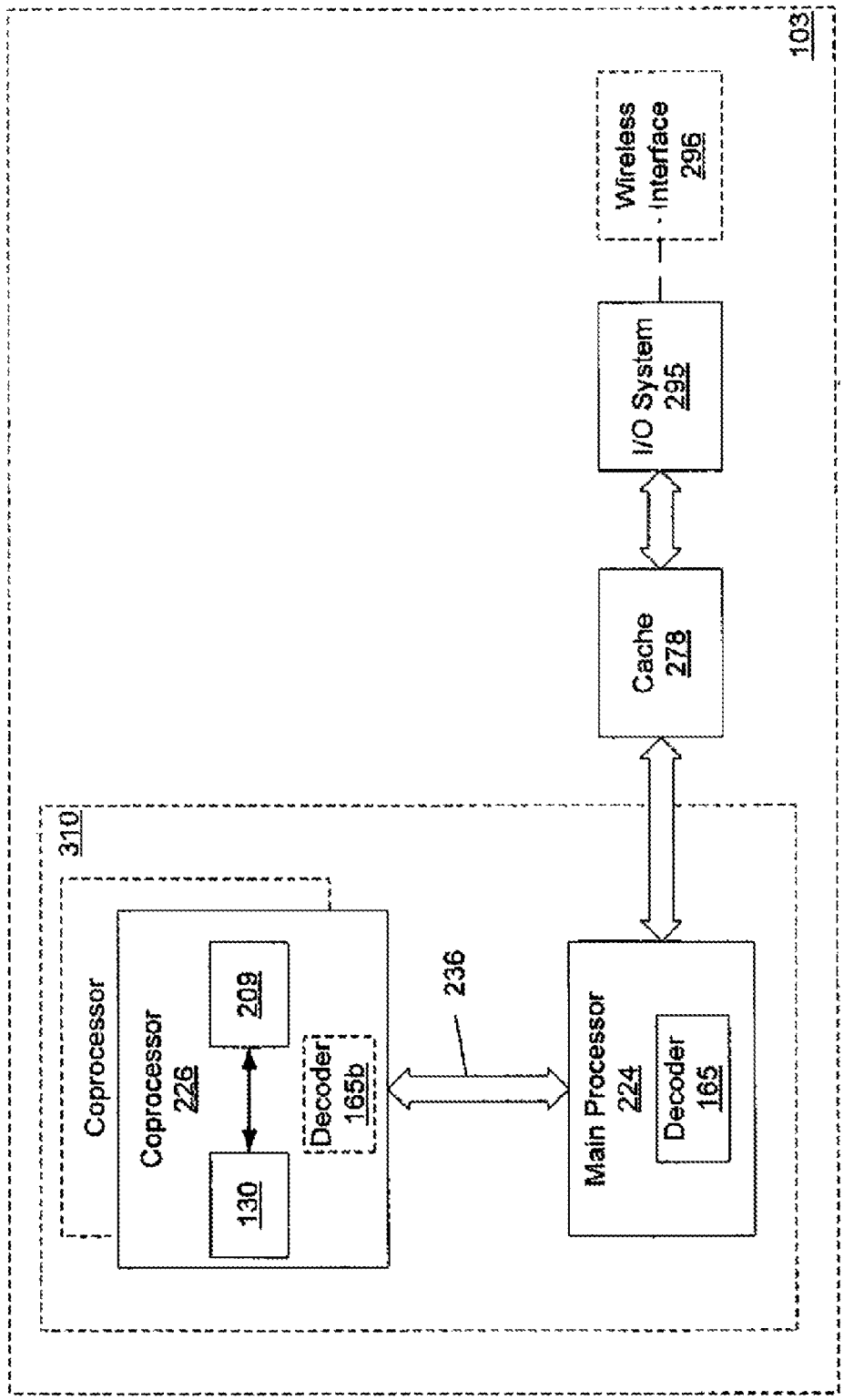

FIG. 1c illustrates alternative embodiments of a data processing system 103 capable of performing LCSZC operations on packed and unpacked data. In accordance with one alternative embodiment, data processing system 103 may include a chip package 310 that includes main processor 224, and one or more coprocessors 226. The optional nature of additional coprocessors 226 is denoted in FIG. 1c with broken lines. One or more of the coprocessors 226 may be, for example, a graphics co-processor capable of executing SIMD instructions.

FIG. 1c illustrates that the data processor system 103 may also include a cache memory 278 and an input/output system 265, both coupled to the chip package 310. The input/output system 295 may optionally be coupled to a wireless interface 296.

Coprocessor 226 is capable of performing general computational operations and is also capable of performing SIMD operations. For at least one embodiment, the coprocessor 226 is capable of performing LCSZC operations on packed and unpacked data.

For at least one embodiment, coprocessor 226 comprises an execution unit 130 and register file(s) 209. At least one embodiment of main processor 224 comprises a decoder 165 to recognize and decode instructions of an instruction set that includes LCSZC instructions for execution by execution unit 130. For alternative embodiments, coprocessor 226 also comprises at least part of decoder 166 to decode instructions of an instruction set that includes LCSZC instructions. Data processing system 103 also includes additional circuitry (not shown) which is not necessary to the understanding of the present invention.

In operation, the main processor 224 executes a stream of data processing instructions that control data processing operations of a general type including interactions with the cache memory 278, and the input/output system 295. Embedded within the stream of data processing instructions are coprocessor instructions. The decoder 165 of main processor 224 recognizes these coprocessor instructions as being of a type that should be executed by an attached coprocessor 226. Accordingly, the main processor 224 issues these coprocessor instructions (or control signals representing the coprocessor instructions) on the coprocessor interconnect 236 where from they are received by any attached coprocessor(s). For the single-coprocessor embodiment illustrated in FIG. 1c, the coprocessor 226 accepts and executes any received coprocessor instructions intended for it. The coprocessor interconnect may be any type of communication pathway, including a multi-drop bus, point-to-pointer interconnect, or the like.

Data may be received via wireless interface 296 for processing by the coprocessor instructions. For one example, voice communication may be received in the form of a digital signal, which may be processed by the coprocessor instructions to regenerate digital audio samples representative of the voice communications. For another example, compressed audio and/or video may be received in the form of a digital bit stream, which may be processed by the coprocessor instructions to regenerate digital audio samples and/or motion video frames.

For at least one alternative embodiment, main processor 224 and a coprocessor 226 may be integrated into a single processing core comprising an execution unit 130, register file(s) 209, and a decoder 165 to recognize instructions of an instruction set that includes LCSZC instructions for execution by execution unit 130.

FIG. 2a illustrates the register file of the processor according to one embodiment of the invention. The register file 150 may be used for storing information, including control/status information, integer data, floating point data, and packed data. One of skill in the art will recognize that the foregoing list of information and data is not intended to be an exhaustive, all-inclusive list.

For the embodiment shown in FIG. 2a, the register file 150 includes integer registers 201, registers 209, status registers 208, and instruction pointer register 211. Status registers 208 indicate the status of processor 109, and may include various status registers such as a zero flag and a carry flag. Instruction pointer register 211 stores the address of the next instruction to be executed. Integer registers 201, registers 209, status registers 208, and instruction pointer register 211 are all coupled to internal interconnect 170. Additional registers may also be coupled to internal interconnect 170. The internal interconnect 170 may be, but need not necessarily be, a multi-drop bus. The internal interconnect 170 may instead may be any other type of communication pathway, including a point-to-point interconnect.

For one embodiment, the registers 209 may be used for both packed data and floating point data. In one such embodiment, the processor 109, at any given time, treats the registers 209 as being either stack referenced floating point registers or non-stack referenced packed data registers. In this embodiment, a mechanism is included to allow the processor 109 to switch between operating on registers 209 as stack referenced floating point registers and non-stack referenced packed data registers. In another such embodiment, the processor 109 may simultaneously operate on registers 209 as non-stack referenced floating point and packed data registers. As another example, in another embodiment, these same registers may be used for storing integer data.

Of course, alternative embodiments may be implemented to contain more or less sets of registers. For example, an alternative embodiment may include a separate set of floating point registers for storing floating point data. As another example, an alternative embodiment may including a first set of registers, each for storing control/status information, and a second set of registers, each capable of storing integer, floating point, and packed data. As a matter of clarity, the registers of an embodiment should not be limited in meaning to a particular type of circuit. Rather, a register of an embodiment need only be capable of storing and providing data, and performing the functions described herein.

The various sets of registers (e.g., the integer registers 201, the registers 209) may be implemented to include different numbers of registers and/or to different size registers. For example, in one embodiment, the integer registers 201 are implemented to store thirty-two bits, while the registers 209 are implemented to store eighty bits (all eighty bits are used for storing floating point data, while only sixty-four are used for packed data). In addition, registers 209 may contain eight registers, $R_0$ 212a through $R_7$ 212h. $R_1$ 212b, $R_2$ 212c and $R_3$ 212d are examples of individual registers in registers 209. Thirty-two bits of a register in registers 209 can be moved into an integer register in integer registers 201. Similarly, a value in an integer register can be moved into thirty-two bits of a register in registers 209. In another embodiment, the integer registers 201 each contain 64 bits, and 64 bits of data may be moved between the integer register 201 and the registers 209. In another alternative embodiment, the registers 209 each contain 64 bits and registers 209 contains sixteen registers. In yet another alternative embodiment, registers 209 contains thirty-two registers.

Figure 2B:
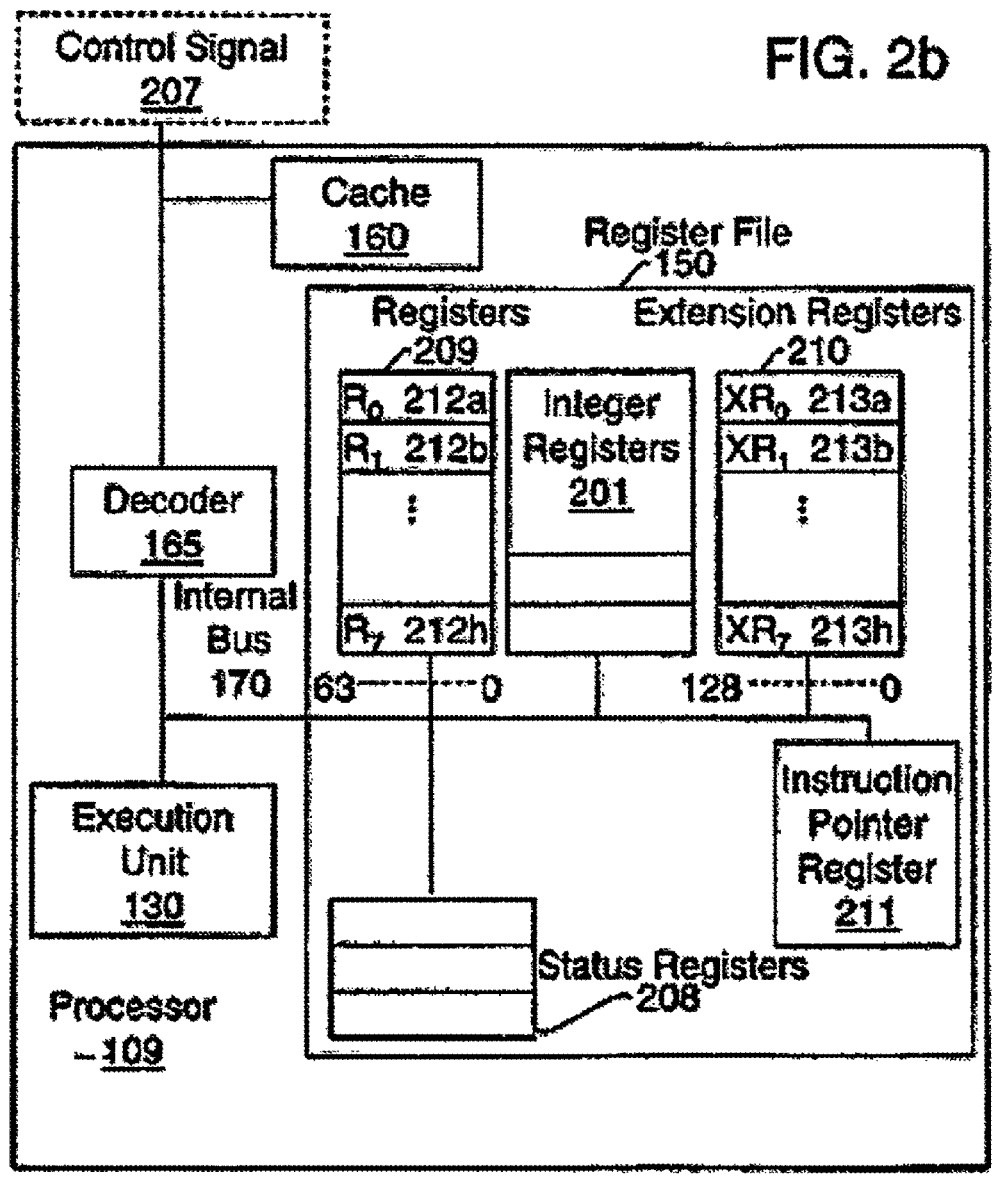

FIG. 2b illustrates the register file of the processor according to one alternative embodiment of the invention. The register file 150 may be used for storing information, including control/status information, integer data, floating point data, and packed data. In the embodiment shown in FIG. 2b, the register file 150 includes integer registers 201, registers 209, status registers 208, extension registers 210, and instruction pointer register 211. Status registers 208, instruction pointer register 211, integer registers 201, registers 209, are all coupled to internal interconnect 170. Additionally, extension registers 210 are also coupled to internal interconnect 170. The internal interconnect 170 may be, but need not necessarily be, a multi-drop bus. The internal interconnect 170 may instead may be any other type of communication pathway, including a point-to-point interconnect.

For at least one embodiment, the extension registers 210 are used for both packed integer data and packed floating point data. For alternative embodiments, the extension registers 210 may be used for scalar data, packed Boolean data, packed integer data and/or packed floating point data. Of course, alternative embodiments may be implemented to contain more or less sets of registers, more or less registers in each set or more or less data storage bits in each register without departing from the broader scope of the invention.

For at least one embodiment, the integer registers 201 are implemented to store thirty-two bits, the registers 209 are implemented to store eighty bits (all eighty bits are used for storing floating point data, while only sixty-four are used for packed data) and the extension registers 210 are implemented to store 128 bits. In addition, extension registers 210 may contain eight registers, $XR_0$ 213a through $XR_7$ 213h. $XR_0$ 213a, $XR_1$ 213b and $XR_2$ 213c are examples of individual registers in registers 210. For another embodiment, the integer registers 201 each contain 64 bits, the extension registers 210 each contain 64 bits and extension registers 210 contains sixteen registers. For one embodiment two registers of extension registers 210 may be operated upon as a pair. For yet another alternative embodiment, extension registers 210 contains thirty-two registers.

Figure 3:
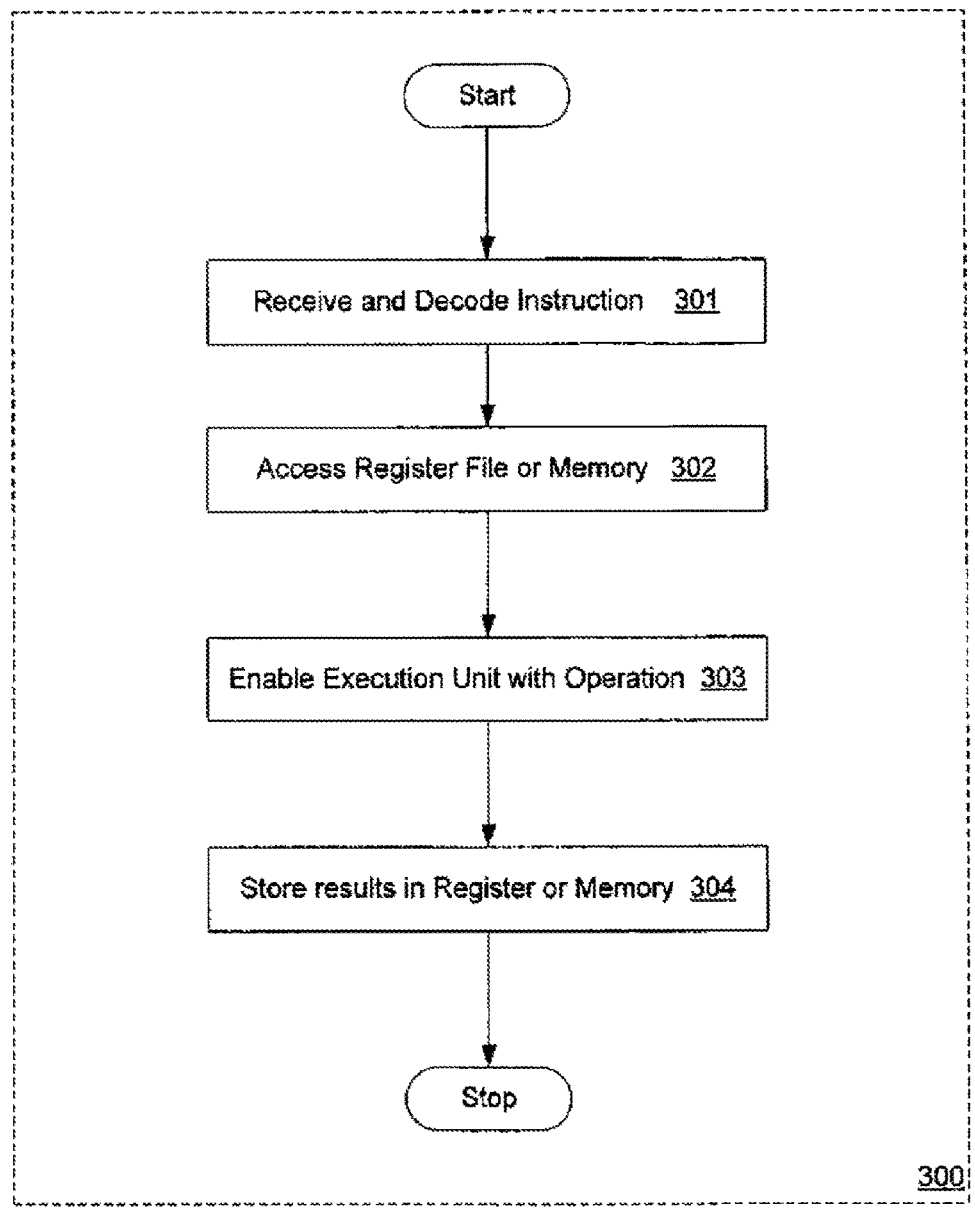
FIG. 3 illustrates a flow diagram for at least one embodiment of a process performed by a processor to manipulate data.

FIG. 3 illustrates a flow diagram for one embodiment of a process 300 to manipulate data according to one embodiment of the invention. That is, FIG. 3 illustrates the process followed, for example, by processor 109 (see, e.g., FIG. 1a) while performing a LCSZC operation on packed data, performing a LCSZC operation on unpacked data, or performing some other operation. Process 300 and other processes herein disclosed are performed by processing blocks that may comprise dedicated hardware or software or firmware operation codes executable by general purpose machines or by special purpose machines or by a combination of both.

FIG. 3 illustrates that processing for the method begins at "Start" and proceeds to processing block 301. At processing block 301, the decoder 165 (see, e.g., FIG. 1a) receives a control signal from either the cache 160 (see, e.g., FIG. 1a) or interconnect 101 (see, e.g., FIG. 1a). The control signal received at block 301 may be, for at least one embodiment, a type of control signal commonly referred to as a software "instruction." Decoder 165 decodes the control signal to determine the operations to be performed. Processing proceeds from processing block 301 to processing block 302.

At processing block 302, decoder 165 accesses the register file 150 (FIG. 1a), or a location in memory (see, e.g., main memory 104 or cache memory 160 of FIG. 1a).

Registers in the register file 150, or memory locations in the memory, are accessed depending on the register address specified in the control signal. For example, the control signal for an operation can include SRC1, SRC2 and DEST register addresses. SRC1 is the address of the first source register. SRC2 is the address of the second source register. In some cases, the SRC2 address is optional as not all operations require two source addresses. If the SRC2 address is not required for an operation, then only the SRC1 address is used. DEST is the address of the destination register where the result data is stored. For at least one embodiment, SRC1 or SRC2 may also used as DEST in at least one of the control signals recognized by the decoder 165.

The data stored in the corresponding registers is referred to as Source1, Source2, and Result respectively. In one embodiment, each of these data may be sixty-four bits in length. For alternative embodiments, one or more of these data may be other lengths, such as one hundred twenty-eight bits in length.

For another embodiment of the invention, any one, or all, of SRC1, SRC2 and DEST, can define a memory location in the addressable memory space of processor 109 (FIG. 1a) or processing core 110 (FIG. 1b). For example, SRC1 may identify a memory location in main memory 104, while SRC2 identifies a first register in integer registers 201 and DEST identifies a second register in registers 209. For simplicity of the description herein, the invention will be described in relation to accessing the register file 150. However, one of skill in the art will recognize that these described accesses may be made to memory instead.

From block 302, processing proceeds to processing block 303. At processing block 303, execution unit 130 (see, e.g., FIG. 1a) is enabled to perform the operation on the accessed data.

Processing proceeds from processing block 303 to processing block 304. At processing block 304, the result is stored back into register file 150 or memory according to requirements of the control signal. Processing then ends at "Stop".

Data Storage Formats

Figure 4:
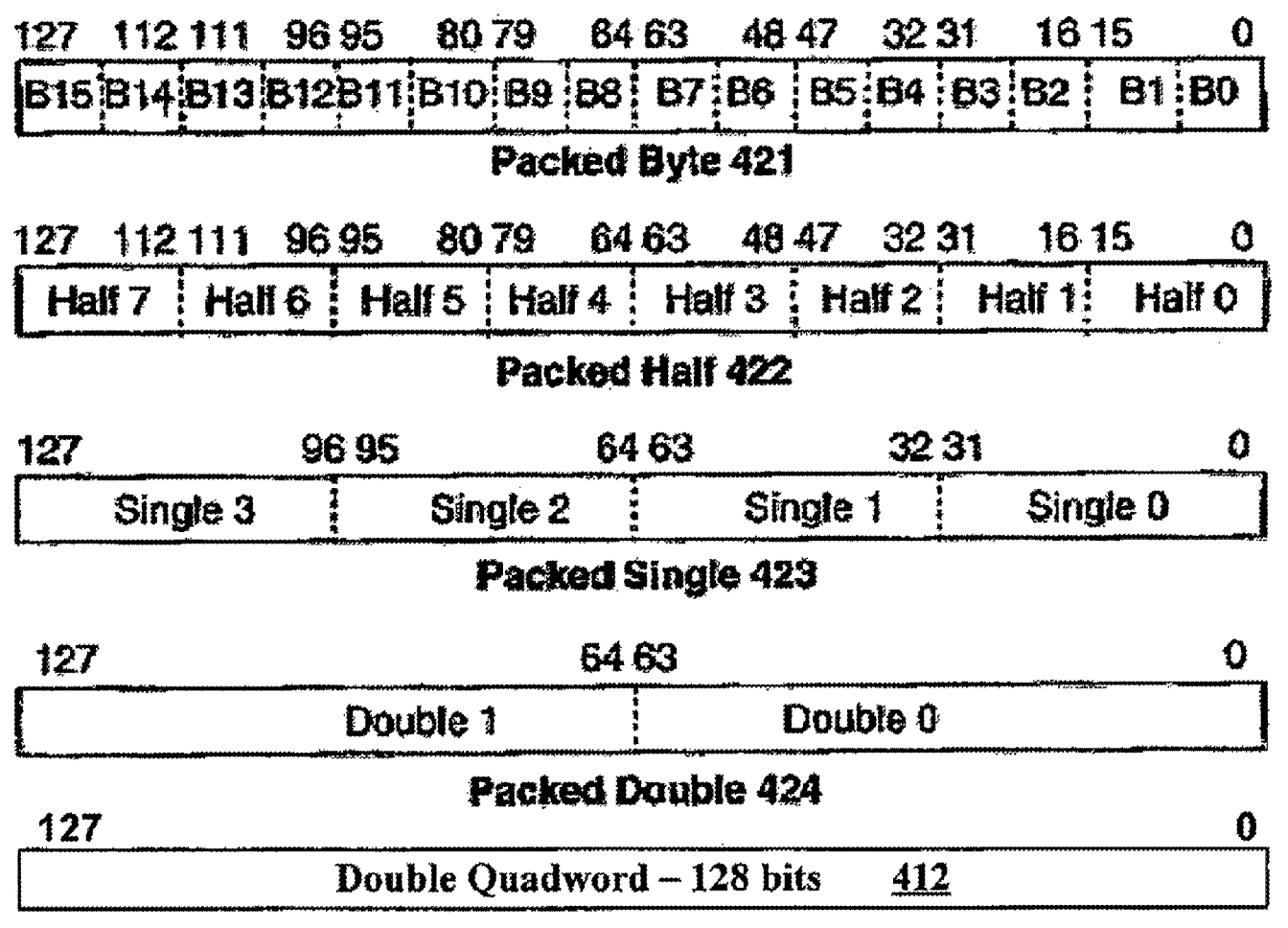

FIG. 4 illustrates packed data-types according to one embodiment of the invention. Four packed and one unpacked data formats are illustrated, including packed byte 421, packed half 422, packed single 423 packed double 424, and unpacked double quadword 412.

The packed byte format 421, for at least one embodiment, is one hundred twenty-eight bits long containing sixteen data elements (B0-B15). Each data element (B0-B15) is one byte (e.g., 8 bits) long.

The packed half format 422, for at least one embodiment, is one hundred twenty-eight bits long containing eight data elements (Half 0 through Half 7). Each of the data elements (Half 0 through Half 7) may hold sixteen bits of information. Each of these sixteen-bit data elements may be referred to, alternately, as a "half word" or "short word" or simply "word."

The packed single format 423, for at least one embodiment, may be one hundred twenty-eight bits long and may hold four 423 data elements (Single 0 through Single 3). Each of the data elements (Single 0 through Single 3) may hold thirty-two bits of information. Each of the 32-bit data elements may be referred to, alternatively, as a "dword" or "double word". Each of the data elements (Single 0 through Single 3) may represent, for example, a 32-bit single precision floating point value, hence the term "packed single" format.

The packed double format 424, for at least one embodiment, may be one hundred twenty-eight bits long and may hold two data elements. Each data element (Double 0, Double 1) of the packed double format 424 may hold sixty-four bits of information. Each of the 64-bit data elements may be referred to, alternatively, as a "qword" or "quadword". Each of the data elements (Double 0, Double 1) may represent, for example, a 64-bit double precision floating point value, hence the term "packed double" format.

The unpacked double quadword format 412 may hold up to 128 bits of data. The data need not necessarily be packed data. For at least one embodiment, for example, the 128 bits of information of the unpacked double quadword format 412 may represent a single scalar datum, such as a character, integer, floating point value, or binary bit-mask value. Alternatively, the 128 bits of the unpacked double quadword format 412 may represent an aggregation of unrelated bits (such as a status register value where each bit or set of bits represents a different flag), or the like.

For at least one embodiment of the invention, the data elements of the packed single 423 and packed double 424 formats may be packed floating point data elements as indicated above. In an alternative embodiment of the invention, the data elements of the packed single 423 and packed double 424 formats may be packed integer, packed Boolean or packed floating point data elements. For another alternative embodiment of the invention, the data elements of packed byte 421, packed half 422, packed single 423 and packed double 424 formats may be packed integer or packed Boolean data elements. For alternative embodiments of the invention, not all of the packed byte 421, packed half 422, packed single 423 and packed double 424 data formats may be permitted or supported.

Figure 5:
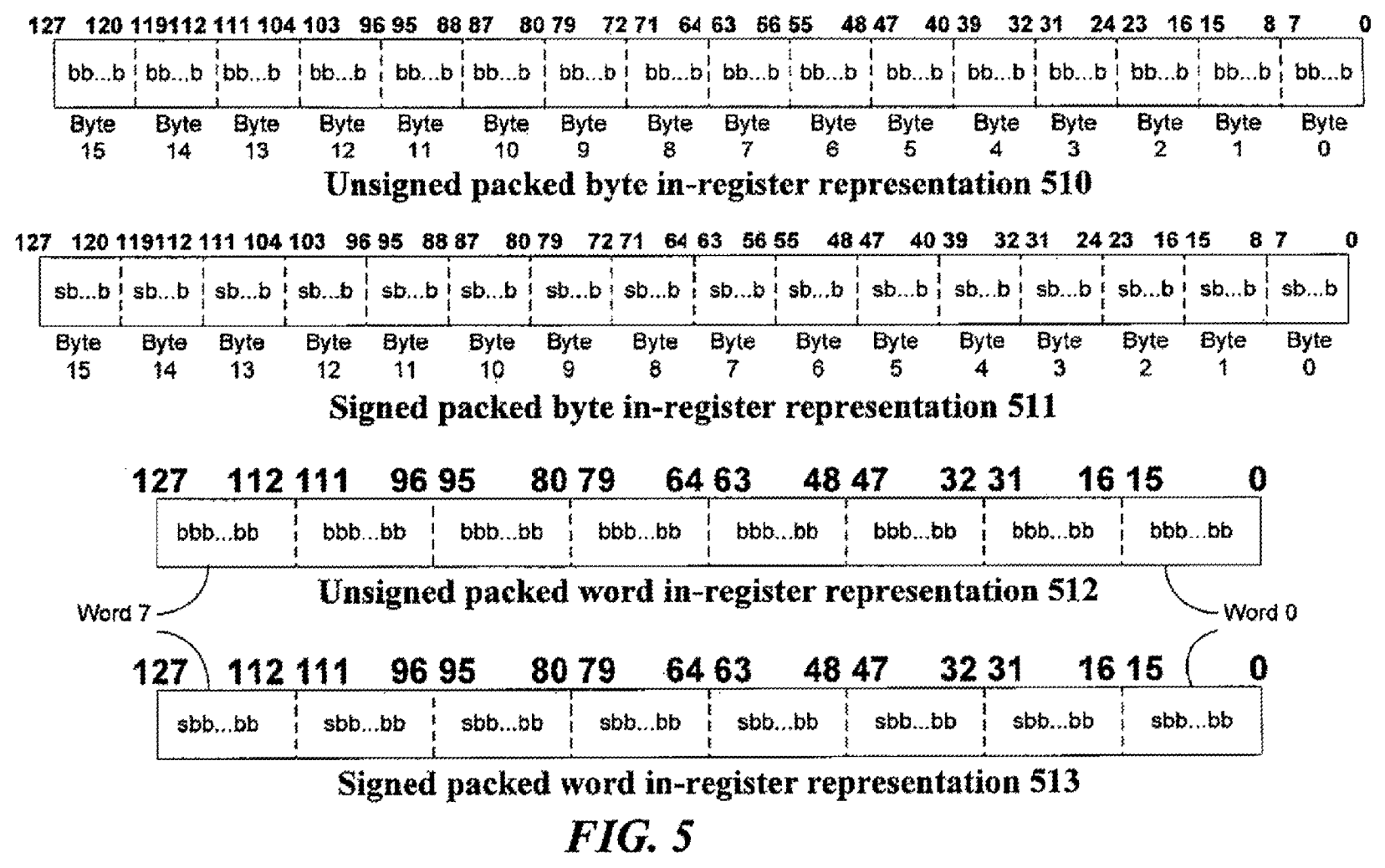

FIGS. 5 and 6 illustrate in-register packed data storage representations according to at least one embodiment of the invention.

FIG. 5 illustrates unsigned and signed packed byte in-register formats 510 and 511, respectively. Unsigned packed byte in-register representation 510 illustrates the storage of unsigned packed byte data, for example in one of the 128-bit extension registers $XR_0$ 213a through $XR_7$ 213h (see, e.g., FIG. 2b). Information for each of sixteen byte data elements is stored in bit seven through bit zero for byte zero, bit fifteen through bit eight for byte one, bit twenty-three through bit sixteen for byte two, bit thirty-one through bit twenty-four for byte three, bit thirty-nine through bit thirty-two for byte four, bit forty-seven through bit forty for byte five, bit fifty-five through bit forty-eight for byte six, bit sixty-three through bit fifty-six for byte seven, bit seventy-one through bit sixty-four for byte eight, bit seventy-nine through bit seventy-two for byte nine, bit eighty-seven through bit eighty for byte ten, bit ninety-five through bit eighty-eight for byte eleven, bit one hundred three through bit ninety-six for byte twelve, bit one hundred eleven through bit one hundred four for byte thirteen, bit one hundred nineteen through bit one hundred twelve for byte fourteen and bit one hundred twenty-seven through bit one hundred twenty for byte fifteen.

Thus, all available bits are used in the register. This storage arrangement increases the storage efficiency of the processor. As well, with sixteen data elements accessed, one operation can now be performed on sixteen data elements simultaneously.

Signed packed byte in-register representation 511 illustrates the storage of signed packed bytes. Note that the eighth (MSB) bit of every byte data element is the sign indicator ("s").

FIG. 5 also illustrates unsigned and signed packed word in-register representations 512 and 513, respectively.

Unsigned packed word in-register representation 512 shows how extension registers 210 store eight word (16 bits each) data elements. Word zero is stored in bit fifteen through bit zero of the register. Word one is stored in bit thirty-one through bit sixteen of the register. Word two is stored in bit forty-seven through bit thirty-two of the register. Word three is stored in bit sixty-three through bit forty-eight of the register. Word four is stored in bit seventy-nine through bit sixty-four of the register. Word five is stored in bit ninety-five through bit eighty of the register. Word six is stored in bit one hundred eleven through bit ninety-six of the register. Word seven is stored in bit one hundred twenty-seven through bit one hundred twelve of the register.

Signed packed word in-register representation 513 is similar to unsigned packed word in-register representation 512. Note that the sign bit ("s") is stored in the sixteenth bit (MSB) of each word data element.

FIG. 6 illustrates unsigned and signed packed doubleword in-register formats 514 and 515, respectively. Unsigned packed doubleword in-register representation 514 shows how extension registers 210 store four doubleword (32 bits each) data elements. Doubleword zero is stored in bit thirty-one through bit zero of the register. Doubleword one is stored in bit sixty-three through bit thirty-two of the register. Doubleword two is stored in bit ninety-five through bit sixty-four of the register. Doubleword three is stored in bit one hundred twenty-seven through bit ninety-six of the register.

Signed packed double-word in-register representation 515 is similar to unsigned packed quadword in-register representation 516. Note that the sign bit ("s") is the thirty-second bit (MSB) of each doubleword data element.

FIG. 6 also illustrates unsigned and signed packed quadword in-register formats 516 and 517, respectively. Unsigned packed quadword in-register representation 516 shows how extension registers 210 store two quadword (64 bits each) data elements. Quadword zero is stored in bit sixty-three through bit zero of the register. Quadword one is stored in bit one hundred twenty-seven through bit sixty-four of the register.

Signed packed quadword in-register representation 517 is similar to unsigned packed quadword in-register representation 516. Note that the sign bit ("s") is the sixty-fourth bit (MSB) of each quadword data element.

Logical Compare-and-Swap,
Set-Zero-and-Carry-Flags Operation(s)

For at least one embodiment of the invention, the SRC1 register may hold packed data or an unpacked double quadword of data (Source1) and the DEST register may also hold packed data or an unpacked double quadword of data (Dest). The Dest value in the DEST register or the Source1 value in the SRC1 register, for at least one embodiment, may be a double quadword of unpacked data to be used as a bitwise mask value.

Generally, in the first step of the LCSZC instruction, two compare operations are preformed. A first intermediate result is generated by performing an independent logical comparison (bitwise AND operation) of each bit in Source1 with the respective bit of Dest. A second intermediate result is generated by performing an independent logical comparison (bitwise AND operation) of each bit in Source1 with the complement of the respective bit of Dest. These intermediate results may be stored in temporary storage locations (such as, e.g., a register), or may not be stored by the processor at all.

Figure 7A:
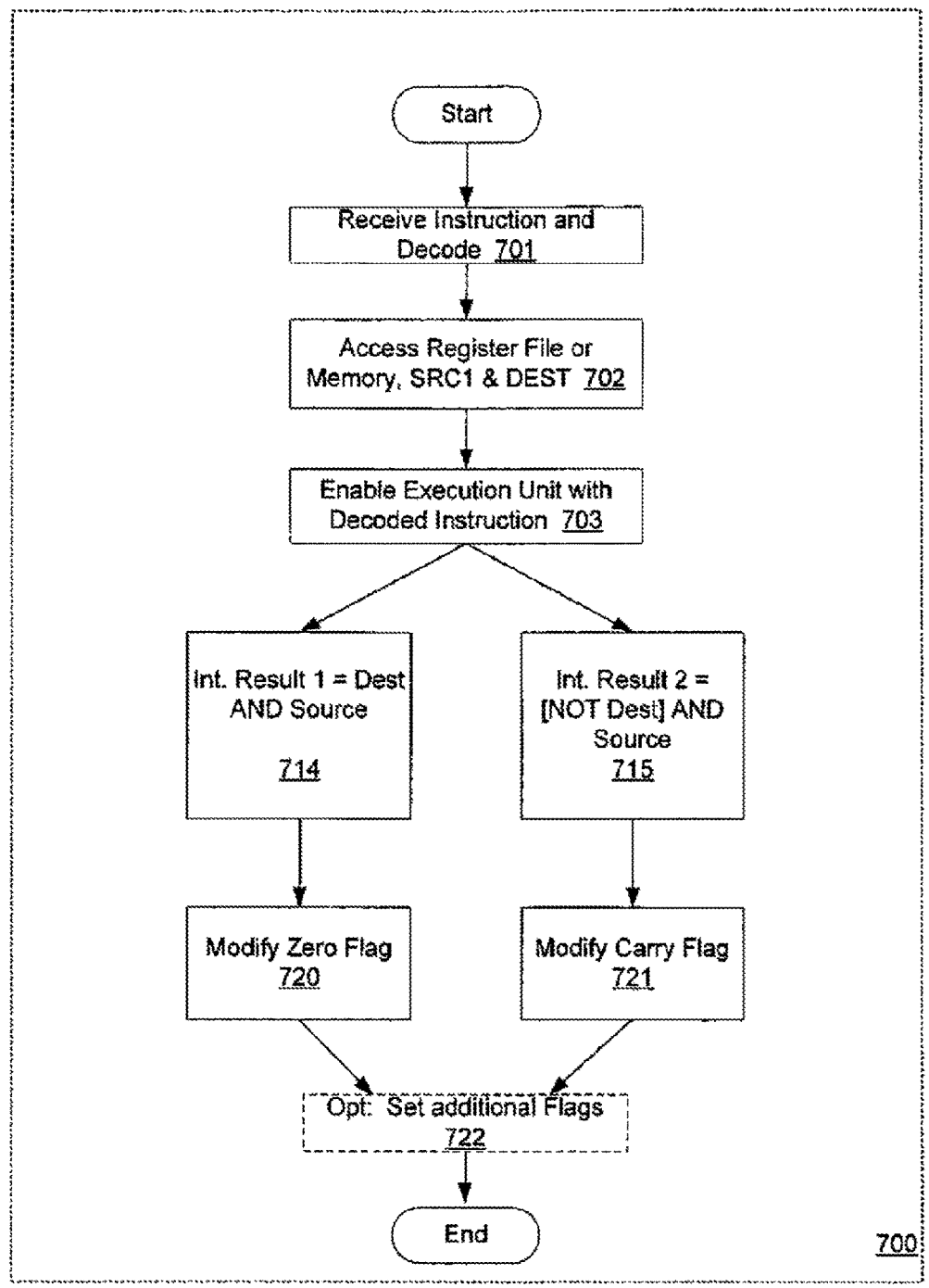
FIGS. 7a-7d are flow diagrams illustrating various embodiments of processes for performing logical-compare, set-zero-and-carry-flag operations.

FIG. 7a is a flow diagram for a general method 700 for performing LCSZC operations according to at least one embodiment of the invention. Process 700 and other processes herein disclosed are performed by processing blocks that may comprise dedicated hardware or software or firmware operation codes executable by general purpose machines or by special purpose machines or by a combination of both. FIGS. 7a through 7d are discussed in the following paragraphs with reference to FIG. 1a.

FIG. 7a illustrates that the method 700 begins at "Start" and proceeds to processing block 701. At processing block 701, decoder 165 decodes the control signal received by processor 109. Thus, decoder 165 decodes the operation code for a LCSZC instruction. Processing then proceeds from processing block 701 to processing block 702.

At processing block 702, via internal bus 170, decoder 165 accesses registers 209 in register file 150 given the SRC1 and DEST addresses encoded in the instruction. For at least one embodiment, the addresses that are encoded in the instruction each indicate an extension register (see, e.g., extension registers 210 of FIG. 2b). For such embodiment, the indicated extension registers 210 are accessed at block 702 in order to provide execution unit 130 with the data stored in the SRC1 register (Source1), and the data stored in the DEST register (Dest). For at least one embodiment, extension registers 210 communicate the data to execution unit 130 via internal bus 170.

From processing block 702, processing proceeds to processing block 703. At processing block 703, decoder 165 enables execution unit 130 to perform the instruction. For at least one embodiment, such enabling 703 is performed by sending one or more control signals to the execution unit to indicate the desired operation (LCZCS). From block 703, processing proceeds to processing blocks 714 and 715. While blocks 714 and 715 are shown in parallel, one of skill in the art will recognize that such operations need be performed exactly simultaneously as long as they are performed in the same cycle or set of cycles and that, for at least one alternative embodiment, the processing of blocks 714 and 715 may be performed serially. Different embodiments thus may perform the processing of blocks 714 and 715 in parallel, in series, or in some combination of serial and parallel operations.

At processing block 714, the following is performed. All or some of Source1 bits are logically AND'ed with the same respective bits of the Dest value. Similarly, at processing block 715, all or some of Source1 bits are logically AND'ed with the complement of the same respective bits of the Dest value.

From block 714, processing proceeds to block 720. From block 715, processing proceeds to block 721.

At processing block 720, the state of the processor is modified based on the results of the comparison performed at processing block 714. Similarly, at processing block 721 the state of the processor is modified based on the results of the comparison preformed at processing block 715. One of skill in the art will note that the method 700 illustrated in FIG. 7a is non-destructive, in that neither the Source1 nor Dest operand values are modified as a result of the LCSZC operation. Instead, the zero flag is modified at block 720 and the carry flag is modified at block 721.

At processing block 720, the value of the zero flag is set to a true value (e.g., a logic-high value), if all bits of Intermediate Result 1 are equal to zero (e.g., a logic-low value). If, however, even one bit of the Intermediate Result 1 is a logic-high value, then the zero flag is set to a false value (e.g., logic-low value) at block 720.

At processing block 721, the value of the carry flag is set to a true value (e.g., a logic-high value), if all bits of Intermediate Result 2 are equal to zero (e.g., a logic-low value). If, however, even one bit of the Intermediate Result 2 is a logic-high value, then the carry flag is set to a false value (e.g., logic-low value) at block 721.

It will be appreciated that alternative embodiments of process 700 may implement only processing blocks 714 and 720, but not processing blocks 715 and 721, or only processing blocks 715 and 721, but not processing blocks 714 and 720. It will also be appreciated that alternative embodiments of process 700 may implement additional processing blocks to support additional variations of the LCSZC instructions.

From blocks 720 and 721, processing may optionally proceed to block 722. At block 722, other state bits within the processor may be modified. For at least one embodiment, these state bits may include, for example, one or more other architecturally visible status flag values. These flags may be one- or two-bit values and may include parity (PF), auxiliary carry (AF), sign (SF), trap (TF), interrupt enable/disable (IF), direction (DF), overflow (OF), I/O privilege level (IOPL), nested task (NT), resume (RF), virtual 8086 mode (VM), alignment check (AC), virtual interrupt (VIF), virtual interrupt pending (FIP), and CPU identifier (ID) flags and the like. Of course, the preceding listing of specific flags is intended to be illustrative only; other embodiments may include fewer, more, or different flags.

From optional block 722, processing ends at "End." For embodiments that do not include optional block 722, processing ends at "End" after the processing at blocks 720 and 721.

Figure 7B:
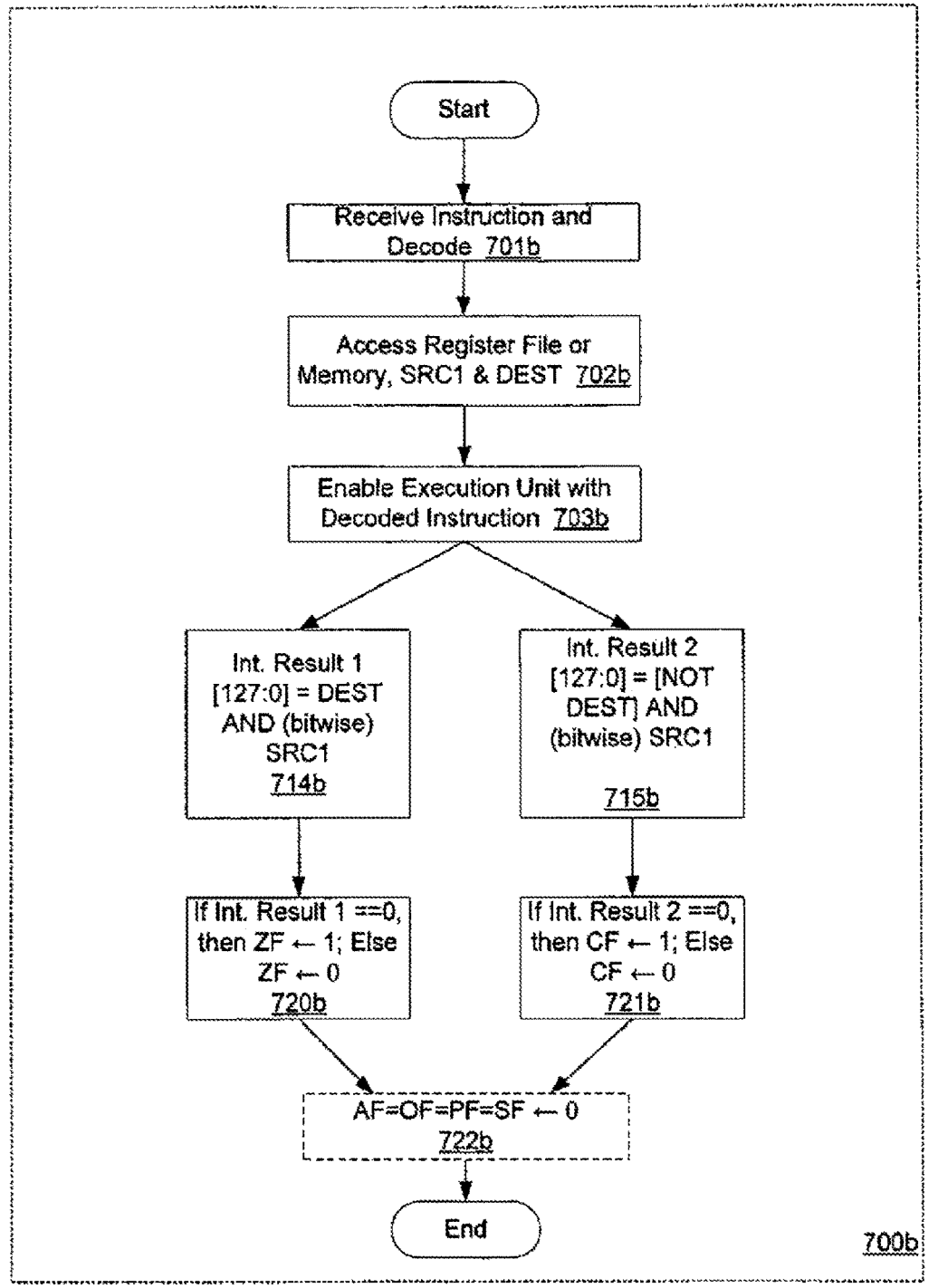

FIG. 7b illustrates a flow diagram for at least one specific embodiment 700b of the general method 700 illustrated in FIG. 7a. For the specific embodiment 700b illustrated in FIG. 7b, the LCSZC operation is performed on Source1 and Dest data values that are 128 bits in length, and which may or may not be packed data. (Of course, one of skill in the art will recognize that the operations illustrated in FIG. 7b may also be performed for data values of other lengths, including those that are smaller or larger than 128 bits).

Processing blocks 701b through 703b operate essentially the same for method 700b as do processing blocks 701 through 703 that are described above in connection with method 700, illustrated in FIG. 7a. When decoder 165 enables execution unit 130 to perform the instruction at block 703c, the instruction is an LCSZC instruction for performing logical AND comparisons of respective bits of the Source1 and Dest values. (See, e.g., signed packed doubleword in-register representation 515 illustrated in FIG. 6). Such instruction may be referred to by an instruction mnemonic that may be used by application programmers, such as "PTEST". From block 703c, processing proceeds to blocks 714c and 715c. Again, blocks 714c and 715c may be, but need not necessarily be, performed in parallel.

From processing block 703b, processing proceeds to processing blocks 714b and 715b. As indicated above in connection with processing blocks 714 and 715 of FIG. 7a, it should be noted again that, although blocks 714b and 715b are illustrated in FIG. 7b as being performed in parallel, the invention should be construed to be limited in this regard. Instead, different embodiments may perform the processing of blocks 714b and 715b in parallel, in series, or in some combination of serial and parallel operations.

At processing block 714b, the following is performed. All of Source1 bits are logically AND'ed with the same respective bits of the Dest value. That is, bits [127:0] of Intermediate Result 1 are assigned the result of bitwise AND operations of the respective bits of Source1 [127:0] with Dest [127:0].

Similarly, at processing block 715b, all of Source1 bits are logically AND'ed with the complement of the same respective bits of the Dest value. That is, bits [127:0] of Intermediate Result 2 are assigned the result of bitwise AND operations of the bits of Source1 [127:0] with the respective complemented bits of Dest [127:0].

From block 714b, processing proceeds to block 720b. From block 715b, processing proceeds to block 721b.

At processing block 720b, the state of the processor is modified based on the results of the comparison performed at processing block 714b. Similarly, at processing block 721b the state of the processor is modified based on the results of the comparison preformed at processing block 715b. One of skill in the art will note that the method 700b illustrated in FIG. 7b is non-destructive, in that neither the Source1 nor Dest operand values are modified as a result of the LCSZC operation. Instead, the zero flag is modified at block 720b and the carry flag is modified at block 721b.

At processing block 720b, the value of the zero flag is set to a true value (e.g., a logic-high value), if all bits of Intermediate Result 1 (e.g., bits [127:0] of Intermediate Result 1) are equal to zero (e.g., a logic-low value). If, however, even one bit of the Intermediate Result 1 is a logic-high value, then the zero flag is set to a false value (e.g., logic-low value) at block 720b.

At processing block 721b, the value of the carry flag is set to a true value (e.g., a logic-high value), if all bits of Intermediate Result 2 (e.g., bits [127:0] of Intermediate Result 2) are equal to zero (e.g., a logic-low value). If, however, even one bit of the Intermediate Result 2 is a logic-high value, then the carry flag is set to a false value (e.g., logic-low value) at block 721b.

It will be appreciated that alternative embodiments of process 700b may implement only processing block 714b and 720b and not processing block 715b and 721b, or only processing blocks 715b and 721b and not processing blocks 714b and 720b. It will also be appreciated that alternative embodiments of process 700b may implement additional processing blocks to support additional variations of the LCSZC instructions.

From blocks 720b and 721b, processing may optionally proceed to block 722b. At block 722b, other state bits within the processor may be modified. For the embodiment illustrated in FIG. 7b, the AF (auxiliary carry), OF (overflow), PF (parity) and SF (sign) flags are assigned to a logic-low value at block 722b.

From optional block 722b, processing ends at "End." For embodiments that do not include optional block 722b, processing ends at "End" after the processing at blocks 720b and 721b.

It will be appreciated that alternative embodiments of processing blocks 714, 714b, 715, or 715b may perform logical comparison operations on signed or unsigned data elements or on a combination of both.

Figure 7C:
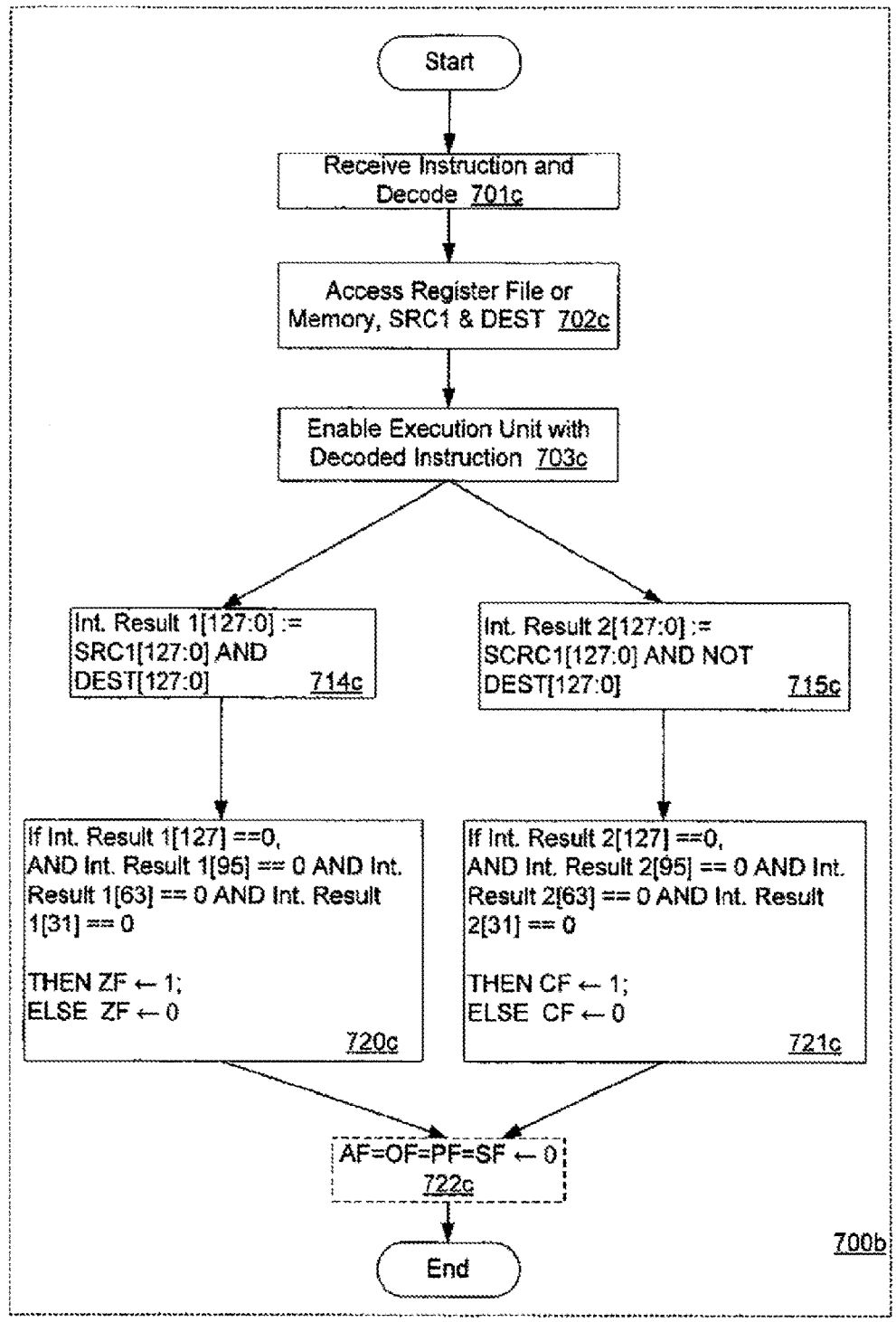

FIG. 7c illustrates a flow diagram for at least one alternative specific embodiment 700c of the general method 700 illustrated in FIG. 7a. For the specific embodiment 700c illustrated in FIG. 7c, the LCSZC operation is performed on Source1 and Dest data values that are 128 bits in length. The source or destination operand, or both, may be packed, in that the 128-bit data value of the source operand represents four packed 32-bit ("doubleword") data elements. The data elements may each represent, for example, thirty-two bit signed single-precision floating point values.

Of course, one of skill in the art will recognize that the operations illustrated in FIG. 7c may also be performed for data values of other lengths, including those that are smaller or larger than 128 bits and for other sizes of data elements, including bytes (8 bits) and/or short words (16 bits).

Processing blocks 701c through 703c operate essentially the same for method 700c as do processing blocks 701 through 703 that are described above in connection with method 700, illustrated in FIG. 7a. An exception to the foregoing statement is that, for processing block 703c, when decoder 165 enables execution unit 130 to perform the instruction, the instruction is a LCSZC instruction for performing logical AND comparisons of the MSB of each 32-bit doubleword of the Source1 and Destination values. (See, e.g., signed packed doubleword in-register representation 515 illustrated in FIG. 6). Such instruction may be referred to by an instruction mnemonic to be used by programmers, such as "TESTPS", where "PS" indicates Packed Single-precision data elements.

From block 703c, processing proceeds to blocks 714c and 715c. Again, blocks 714c and 715c may be, but need not necessarily be, performed in parallel.

At processing block 714c, the following is performed. All of Source1 bits are logically AND'ed with the same respective bits of the Dest value. That is, bits [127:0] of Intermediate Result 1 are assigned the result of bitwise AND operations of the respective bits of Source1 [127:0] with Dest [127:0].

Similarly, at processing block 715c, all of Source1 bits are logically AND'ed with the complement of the same respective bits of the Dest value. That is, bits [127:0] of Intermediate Result 2 are assigned the result of bitwise AND operations of the bits of Source1 [127:0] with the respective complemented bits of Dest [127:0].

From block 714c, processing proceeds to block 720c. From block 715c, processing proceeds to block 721c.

At block 720c, the MSB of each 32-bit double-word of the first intermediate value, Intermediate Value 1, is determined. If bits 127, 95, 63 and 31 of Intermediate Value 1 are equal to zero, then the zero flag is set to a logic-high value at block 720c. Otherwise, the zero flag is set to a logic-low value at block 720c.

Similarly, at block 721c, the MSB of each 32-bit doubleword of the second intermediate value, Intermediate Value 2, is determined. If bits 127, 95, 63 and 31 of Intermediate Value 2 are equal to zero, then the carry flag is set to a logic-high value at block 721c. Otherwise, the carry flag is set to a logic-low value at block 721c. Neither the original value (Source1) of the source register (SRC1) nor the original value (Dest) of the destination register (DEST) is modified as a result of the processing of the method 700c.

From block 720c and 721c, processing proceeds either to "End" or to optional processing block 722c. At block 722c, other state bits within the processor may be modified. For the embodiment illustrated in FIG. 7c, the AF (auxiliary carry), OF (overflow), PF (parity) and SF (sign) flags are assigned to a logic-low value at block 722c.

For embodiments that do not include optional block 722c, processing ends at "End" after the processing at blocks 720c and 721c. For embodiments that do include optional block 722c, processing ends after completion of the processing block 722c.

Figure 7D:
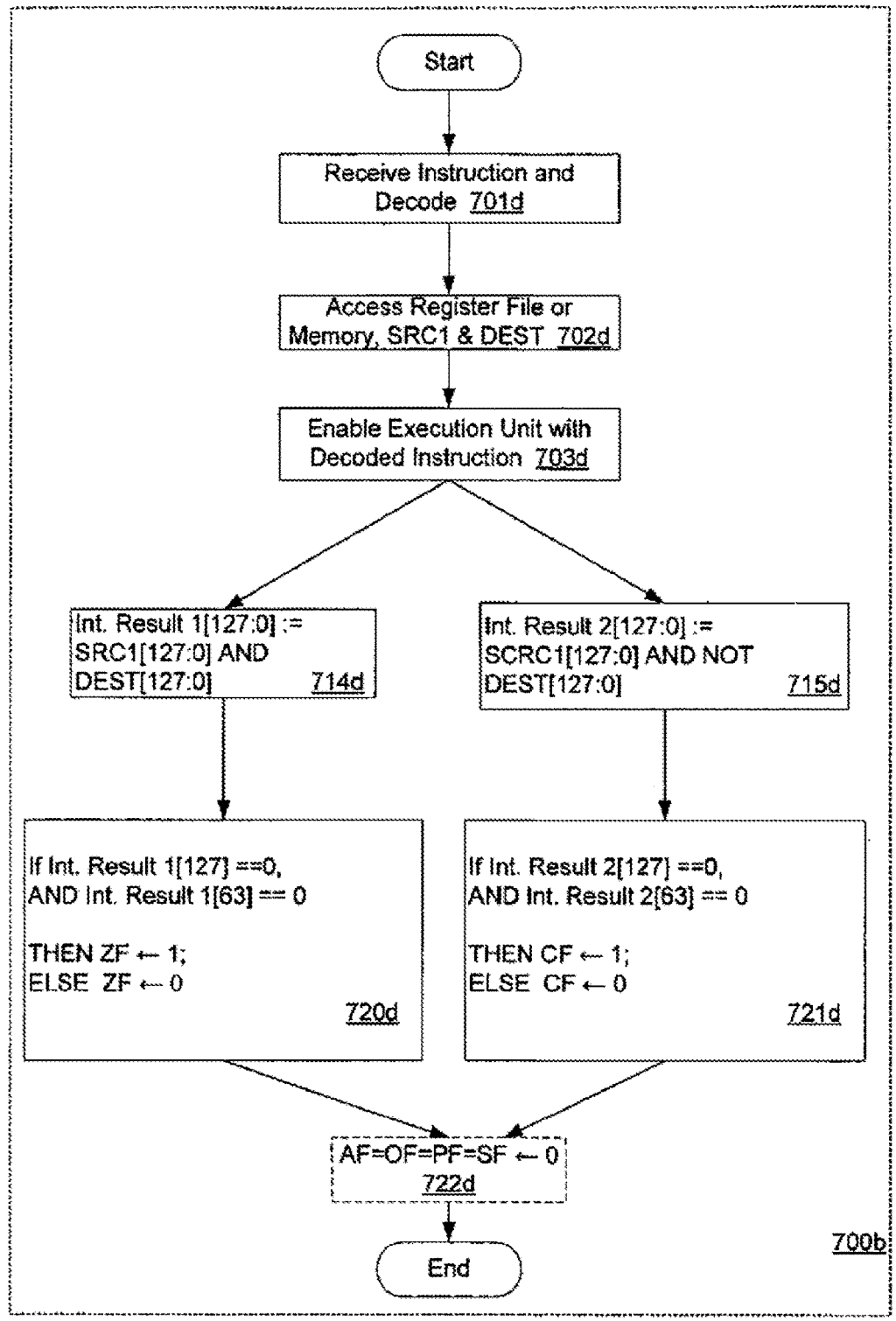

FIG. 7d illustrates a flow diagram for at least one alternative specific embodiment 700d of the general method 700 illustrated in FIG. 7a. For the specific embodiment 700d illustrated in FIG. 7d, the LCSZC operation is performed on Source1 and Dest data values that are 128 bits in length. The source or destination operand, or both, may be packed, in that the 128-bit data value of the source operand represents two packed 64-bit data elements. The data elements may each represent, for example, sixty-four bit signed double-precision floating point values.

Of course, one of skill in the art will recognize that the operations illustrated in FIG. 7d may also be performed for data values of other lengths, including those that are smaller or larger than 128 bits and for other sizes of data elements, including bytes (8 bits) and/or short words (16 bits).

Processing blocks 701d through 703d operate essentially the same for method 700c as do processing blocks 701 through 703 that are described above in connection with method 700, illustrated in FIG. 7a. An exception to the foregoing statement is that, for processing block 703d, when decoder 165 enables execution unit 130 to perform the instruction, the instruction is a LCSZC instruction for performing logical AND comparisons of the MSB of each 64-bit double-word of the Source1 and Destination values. (See, e.g., signed packed quadword in-register representation 517 illustrated in FIG. 6). Such instruction may be referred to by an instruction mnemonic to be used by programmers, such as "TESTPD", where "PD" indicates Packed Double-precision data elements.

From block 703d, processing proceeds to blocks 714d and 715d. Again, blocks 714d and 715d may be, but need not necessarily be, performed in parallel.

At processing block 714d, the following is performed. All of Source1 bits are logically AND'ed with the same respective bits of the Dest value. That is, bits [127:0] of Intermediate Result 1 are assigned the result of bitwise AND operations of the respective bits of Source1 [127:0] with Dest [127:0].

Similarly, at processing block 715d, all of Source1 bits are logically AND'ed with the complement of the same respective bits of the Dest value. That is, bits [127:0] of Intermediate Result 2 are assigned the result of bitwise AND operations of the bits of Source1 [127:0] with the respective complemented bits of Dest [127:0].

From block 714d, processing proceeds to block 720d. From block 715d, processing proceeds to block 721d.

At block 720d, the MSB of each 64-bit quadword of the first intermediate value, Intermediate Value 1, is determined. If bits 127 and 63 of Intermediate Value 1 are equal to zero, then the zero flag is set to a logic-high value at block 720d. Otherwise, the zero flag is set to a logic-low value at block 720d.

Similarly, at block 721d, the MSB of each 64-bit quadword of the second intermediate value, Intermediate Value 2, is determined. If bits 127 and 63 of Intermediate Value 2 are equal to zero, then the carry flag is set to a logic-high value at block 721d. Otherwise, the carry flag is set to a logic-low value at block 721d. Neither the original value (Source1) of the source register (SRC1) nor the original value (Dest) of the destination register (DEST) is modified as a result of the processing of the method 700d.

From block 720d and 721d, processing proceeds either to "End" or to optional processing block 722d. At block 722d, other state bits within the processor may be modified. For the embodiment illustrated in FIG. 7d, the AF (auxiliary carry), OF (overflow), PF (parity) and SF (sign) flags are assigned to a logic-low value at block 722d.

For embodiments that do not include optional block 722d, processing ends at "End" after the processing at blocks 720d and 721d. For embodiments that do include optional block 722c, processing ends after completion of the processing block 722c.

Logical-Compare, Set-Zero-and-Carry Flag Circuits

Figure 8A:
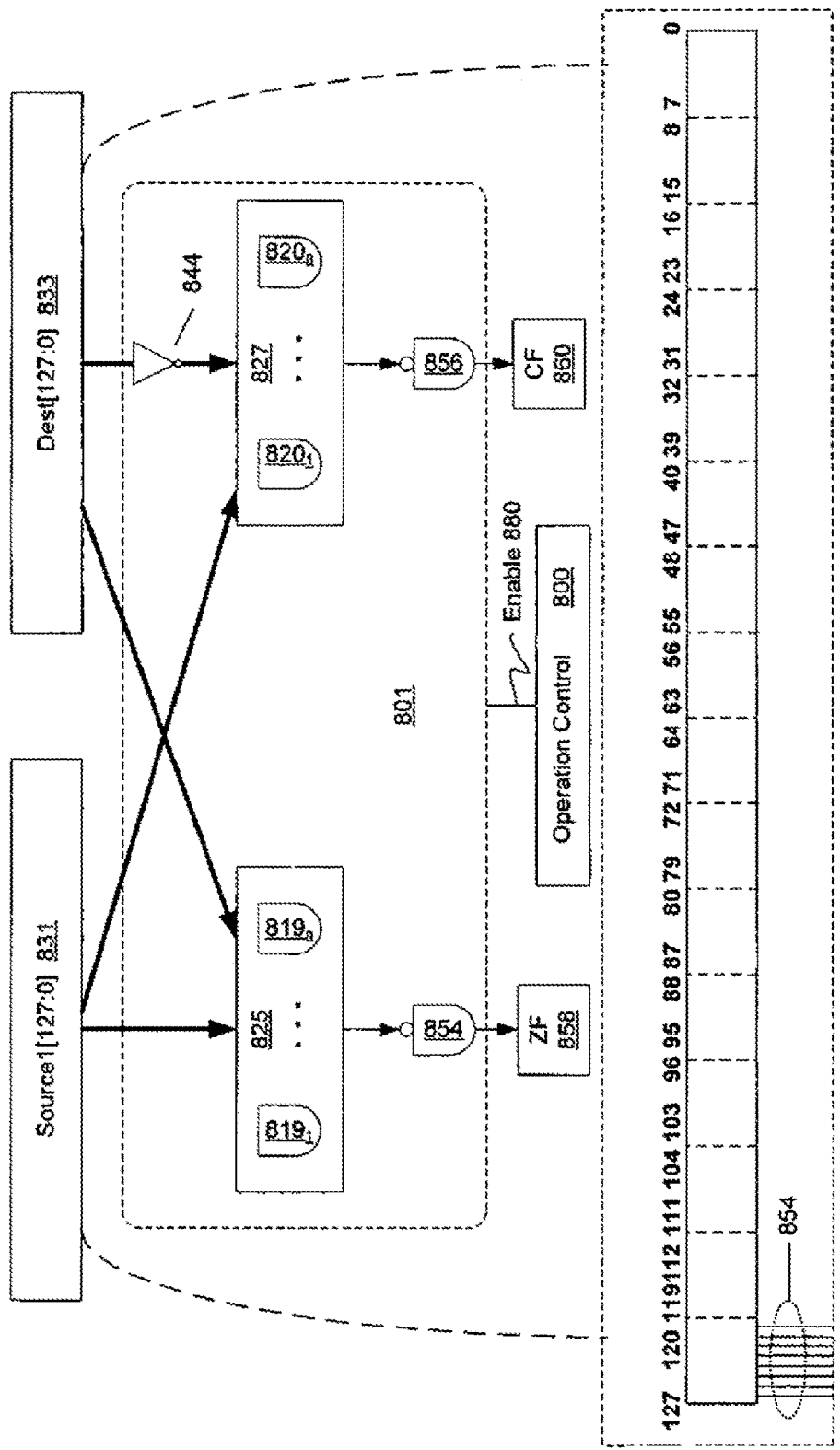
FIGS. 8a-8c illustrate alternative embodiments of circuits for performing logical-compare, set-zero-and-carry-flag operations.
Figure 8B:
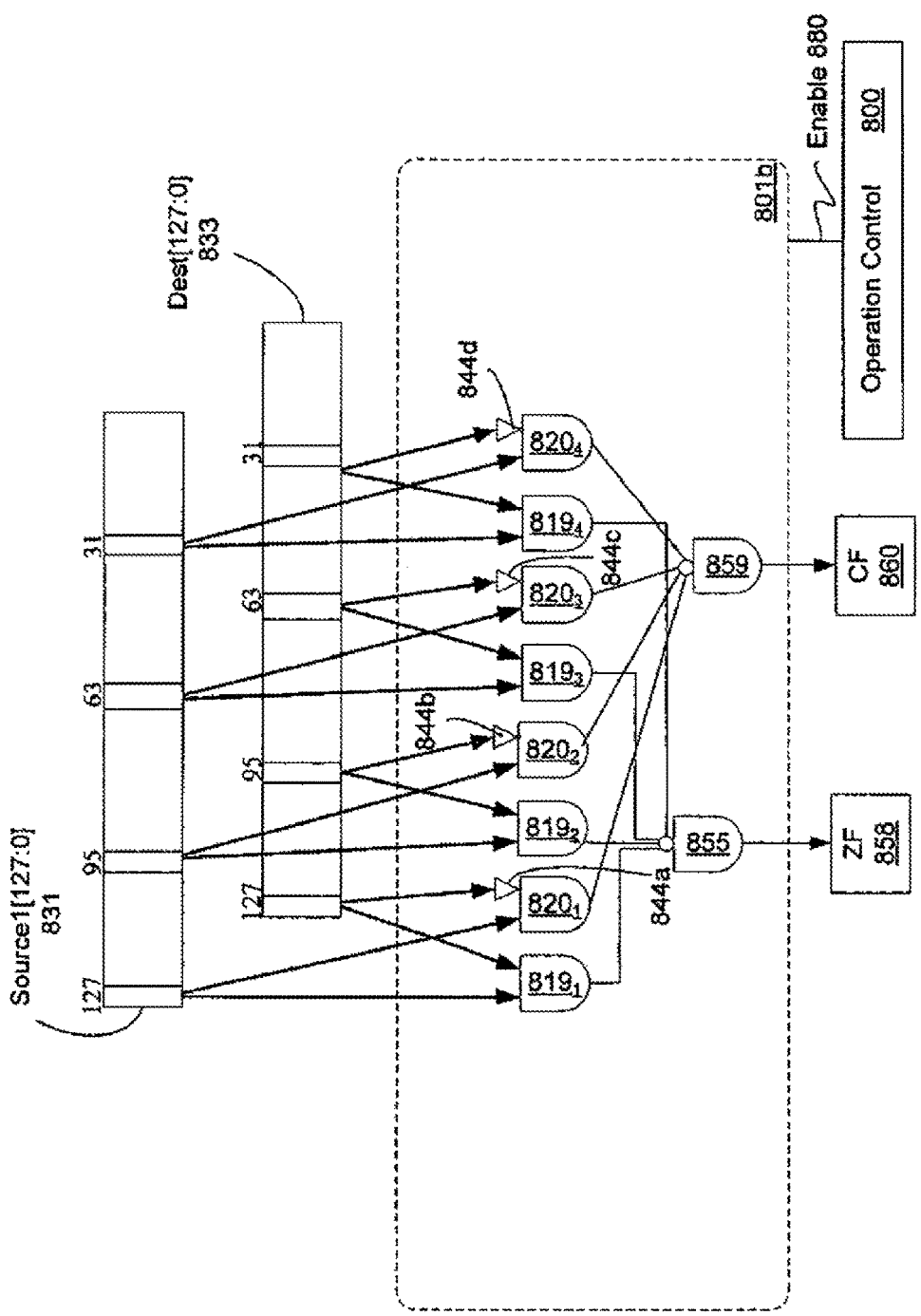

For at least some embodiments, various of the LCSZC instructions for packed data (e.g., TESTPS and TESTPD, discussed above) can execute on multiple data elements in the same number of clock cycles as a compare operation on unpacked data. To achieve execution in the same number of clock cycles, parallelism may be used. That is, elements of a processor (such as registers and execution units) may be simultaneously instructed to perform the LCSZC operations on the data elements. This parallel operation is discussed in more detail below. FIGS. 8a and 8b are discussed below with reference to FIG. 1a.

FIG. 8a illustrates a circuit 801 for performing LCSZC operations on packed data according to at least one embodiment of the invention. The circuit 801 may be, for at least one embodiment, all or part of the logical compare circuitry 145 illustrated in FIG. 1a.

FIG. 8a depicts a source operand, Source1[127:0] 831, and a destination operand, Dest[127:0] 833. For at least one embodiment, the source and destination are stored in N-bit long SIMD registers, such as for example 128-bit Intel® SSE2 XMM registers (see. e.g., extension registers 210 of FIG. 2b).

The particular example embodiment illustrated in FIG. 8a shows a double quadword (128-bit) embodiment of an LCSZC instruction, where every bit of the 128 bit source and destination operands are compared with their respective counterpart. For such embodiment, because each bit is compared, the operation may operate on, and is functionally agnostic of, any nature of 128 bits in the source and destination operands; either or both the source and destination operands may be packed data, unpacked scalar data, signed data, or unsigned data. While in some specific examples packed data sources 831 and destinations 833 may be represented as having 128-bits, it will be appreciated that the principals disclosed herein may be extended to other conveniently selected lengths, such as 80-bits, 128-bits or 256-bits.

Operation control 800 outputs signals on Enable 880 to control operations performed by the circuit 801. One embodiment of operation control 800 may comprise, for example, a decoder 165 and an instruction pointer register 211. Of course, operation control 800 may also comprise additional circuitry which is not necessary to understanding the invention. The LCSZC circuit 801 includes two sets (825, 827) of AND gates, where each set includes one AND gate for each bit of the source operand. Thus, for an embodiment where the source and destination have 128 bits, the first set 825 includes 128 AND gates 819 and the second set 827 includes 128 AND gates 820. Each of the 128 bit values of the source and destination operands (see, e.g., bit values 854 in FIG. 8a) is an input to one of the AND gates 819 in the first set 825 and is also an input to one of the AND gates 820 of the second set 827. It should be noted that the second set of AND gates 827 receives the inputs from the destination operand 833 only after it has been inverted to its complement value (see inverter logic 844).

The output of each of the AND gates 819 in the first set 825 is an input into an NAND gate 854. At least one purpose of NAND gate 854 is to determine whether the result of AND'ing the bits of the source and destination has resulted in a value of all zeros (logic-low values) and, if so, to pass a logic-high value to the zero flag 858 in order to set it.

The output of each of the AND gates 820 in the second set 827 is an input into an NAND gate 856. At least one purpose of NAND gate 856 is to determine whether the result of AND'ing the bits of the source 831 with the complement of the bits of the destination 833 has resulted in a value of all zeros (logic-low values) and, if so, to pass a logic-high value to the carry flag 860 in order to set it.

Alternative embodiments of double quadword LCSZC instructions may include but are not limited to operations for an unsigned double quadword value in both the source and destination as well as operations for a signed double quadword value in both the source and destination. Other alternative embodiments of LCSZC instructions may include operations that apply to other sizes of signed or unsigned data elements (see, e.g., FIG. 8b for a signed doubleword embodiment and FIG. 8c for a signed quadword embodiment).

FIG. 8b illustrates at least one embodiment of a circuit 801b for performing LCSZC operations on packed data according to one alternative embodiment of the invention. Operation control 800 processes the control signal for the packed LCSZC instructions. Such a packed LCSZC instruction may be, for an example, a "TESTPS" instruction that indicates that an LCSZC operation is to be performed on four packed thirty-two bit values. Each of the packed thirty-two bit values may represent, for example, single-precision floating point values. It should be understand that, for such embodiment, it may be that only one of the operands (e.g., source 831 or destination 833) contains the packed single precision floating point values. The other operand may contain, for example, a bit mask.

FIG. 8a illustrates that operation control 800 outputs signals on Enable 880 to control LCSZC circuit 801b. [One of skill in the art will recognize that the LCSZC circuit 801b illustrated in FIG. 8b may be implemented by invoking a subset of the logic elements of LCSZC circuit 801 illustrated in FIG. 8a].

The LCSZC circuit 801b includes two sets of AND gates, where each set includes one AND gate for each bit of the source operand that is to be compared with the corresponding bit of the destination operand. For the embodiment illustrated in FIG. 8b, the most significant bits for each of four 32-bit ("doubleword") data elements are to be compared. Thus, the first set of AND gates includes gates $819_1$ through $819_4$ and the second set of AND gates includes gates $820_1$ through $820_4$.

FIG. 8b illustrates that the value of the MSB for each of the four 32-bit data elements in the source operand 831 and each of the four 32-bit data elements in the destination operand 833 is an input to one of the first set of AND gates 819. More specifically, FIG. 8b illustrates that bit 127 of the source operand 831 and destination operand 833 are both inputs to gate $819_1$, bit 93 of the source operand 831 and destination operand 833 are both inputs to gate $819_2$, bit 63 of the source operand 831 and destination operand 833 are both inputs to gate $819_3$, and bit 31 of the source operand 831 and destination operand 833 are both inputs to gate $819_4$.

FIG. 8b further illustrates that the value of the MSB for each of the four 32-bit data elements in the source operand 831 and each of the four 32-bit data elements in the destination operand 833 is an input to one of the second set of AND gates 820. It should be noted that the second set of AND gates, 820$_1$ through 820$_4$, receives the inputs from the MSB of each doubleword of the destination operand 833 only after they have been inverted to their complement value (see inverters 844a-844d).

More specifically, FIG. 8b illustrates that bit 127 of the source operand 831 and the complement of bit 127 of the destination operand 833 are both inputs to gate 820$_1$, bit 93 of the source operand 831 and the complement of bit 93 of destination operand 833 are both inputs to gate 820$_2$, bit 63 of the source operand 831 and the complement of bit 63 of the destination operand 833 are both inputs to gate 820$_3$, and bit 31 of the source operand 831 and the complement of bit 31 of the destination operand 833 are both inputs to gate 820$_4$.

The output of each of the AND gates 819$_1$ through 819$_4$ is an input into a NAND gate 855. At least one purpose of NAND gate 855 is to determine whether the result of AND'ing the most significant bits of each of the four doublewords of the source and destination has resulted in a value of all zeros (logic-low values) and, if so, to pass a logic-high value to the zero flag 858 in order to set it.

The output of each of the AND gates 820$_1$ through 820$_4$ is an input into NAND gate 859. At least one purpose of NAND gate 859 is to determine whether the result of AND'ing the bits of the source with the complement of the bits of the destination has resulted in a value of all zeros (logic-low values) and, if so, to pass a logic-high value to the carry flag 860 in order to set it.

Alternative embodiments of a packed LCSZC instruction that compares the MSB for each of four doublewords may include but are not limited to operations for packed signed doubleword values in one operand and a bit mask in the other operand, unsigned doubleword values in both the source and destination, and operations for signed doubleword values in both the source and destination, or for a combination. Other alternative embodiments of LCSZC instructions may include operations that apply to other sizes of signed or unsigned data elements.

Figure 8C:
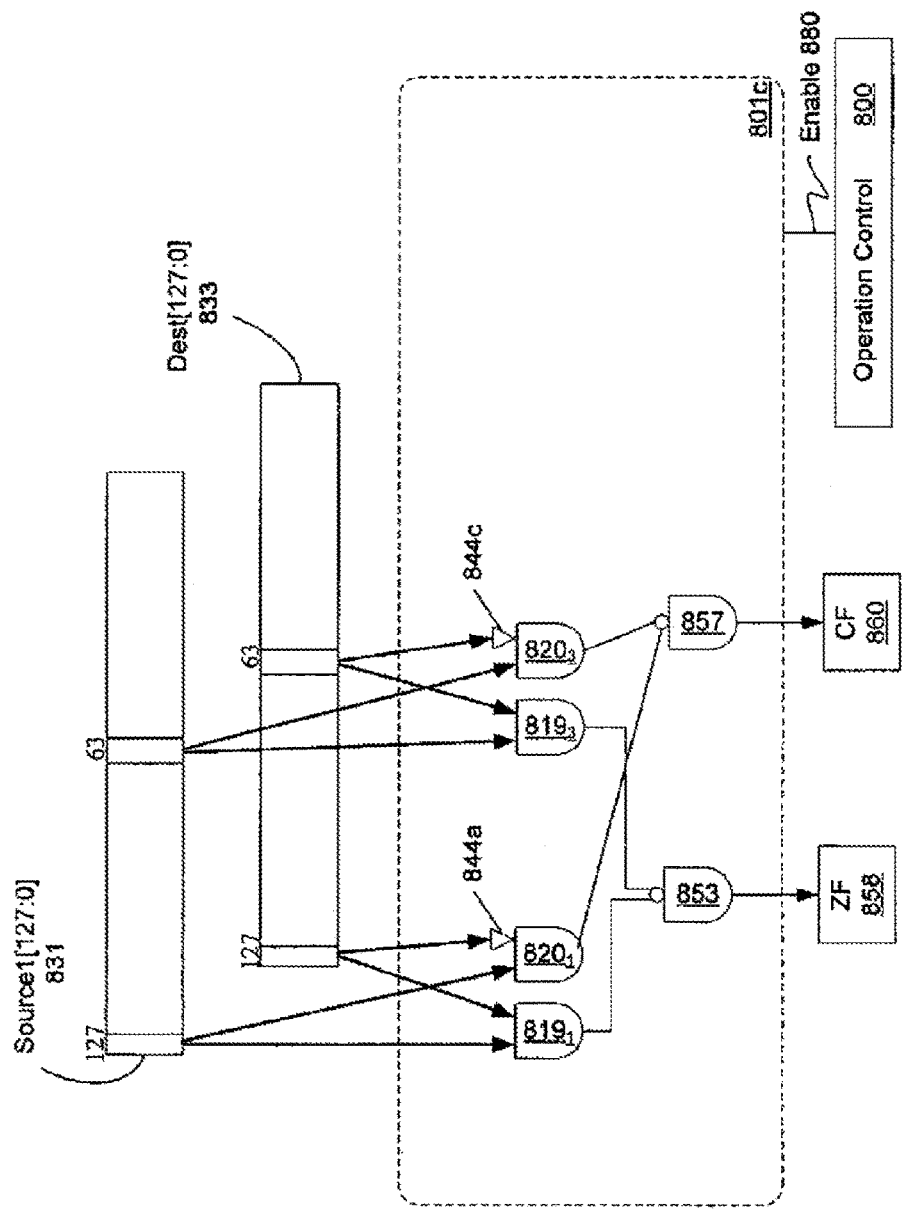

FIG. 8c illustrates at least one embodiment of a circuit 810c for performing LCSZC operations on packed data according to another alternative embodiment of the invention. Operation control 800 processes the control signal for the packed LCSZC instructions. Such a packed LCSZC instruction may be, for an example, a "TESTPD" instruction that indicates that an LCSZC operation is to be performed on two packed double-precision (64-bit) floating point values. Operation control 800 outputs signals on Enable 880 to control LCSZC circuit 801c. [One of skill in the art will recognize that the LCSZC circuit 801c illustrated in FIG. 8c may be implemented by invoking a subset of the logic elements of LCSZC circuit 801 illustrated in FIG. 8a].

As with the circuit 801b discussed above in connection with FIG. 8b, the LCSZC circuit 801c includes two sets of AND gates, where each set includes one AND gate for each bit of the source operand that is to be compared with the corresponding bit of the destination operand. For the embodiment illustrated in FIG. 8c, the most significant bits for each of two 64-bit ("quadword") data elements are to be compared. Thus, the first set of AND gates includes gates 819$_1$ and 819$_3$ and the second set of AND gates includes gates 820$_1$ and 820$_3$.

FIG. 8c illustrates that the value of the MSB for each of the two 64-bit data elements in the source operand 831 and for each of the two 64-bit data elements in the destination operand 833 is an input to one of the first set of AND gates (819$_1$ and 819$_3$). More specifically, FIG. 8c illustrates that bit 127 of the source operand 831 and destination operand 833 are both inputs to gate 819$_1$ and that bit 63 of the source operand 831 and destination operand 833 are both inputs to gate 819$_3$.

FIG. 8c further illustrates that the value of the MSB for each of the two 64-bit data elements in the source operand 831 and for each of the two 64-bit data elements in the destination operand 833 is an input to one of the second set of AND gates (820$_1$ and 820$_3$). It should be noted that the second set of AND gates, 820$_1$ and 820$_3$, receives the inputs from the MSB of each quadword of the destination operand 833 only after they have been inverted to their complement value (see inverters 844a and 844c).

More specifically, FIG. 8c illustrates that bit 127 of the source operand 831 and the complement of bit 127 of the destination operand 833 are both inputs to gate 820$_1$ and that bit 63 of the source operand 831 and the complement of bit 63 of the destination operand 833 are both inputs to gate 820$_3$.

The output of each of the AND gates 819$_1$ and 819$_3$ is an input into a NAND gate 853. At least one purpose of NAND gate 853 is to determine whether the result of AND'ing the most significant bits of each of the two quadwords of the source and destination are both zeros (logic-low values) and, if so, to pass a logic-high value to the zero flag 858 in order to set it.

The output of each of the AND gates 820$_1$ and 820$_3$ is an input into NAND gate 857. At least one purpose of NAND gate 857 is to determine whether the result of AND'ing the most significant bits of each of the two quadwords of the source and destination are both zeros (logic-low values) and, if so, to pass a logic-high value to the carry flag 860 in order to set it.

Alternative embodiments of a packed LCSZC instructions that compares the MSB for each of two quadwords may include but are not limited to operations for unsigned quadword values in both the source and destination as well as operations for signed quadword values in both the source and destination, or for a combination. Other alternative embodiments of LCSZC instructions may include operations that apply to other sizes of signed or unsigned data elements.

As is explained above, a decoder 165 may recognize and decode the control signal received by processor 109, and that control signal may be the operation code for an LCSZC instruction. Thus, decoder 165 decodes the operation code for a LCSZC instruction.

Figure 9:
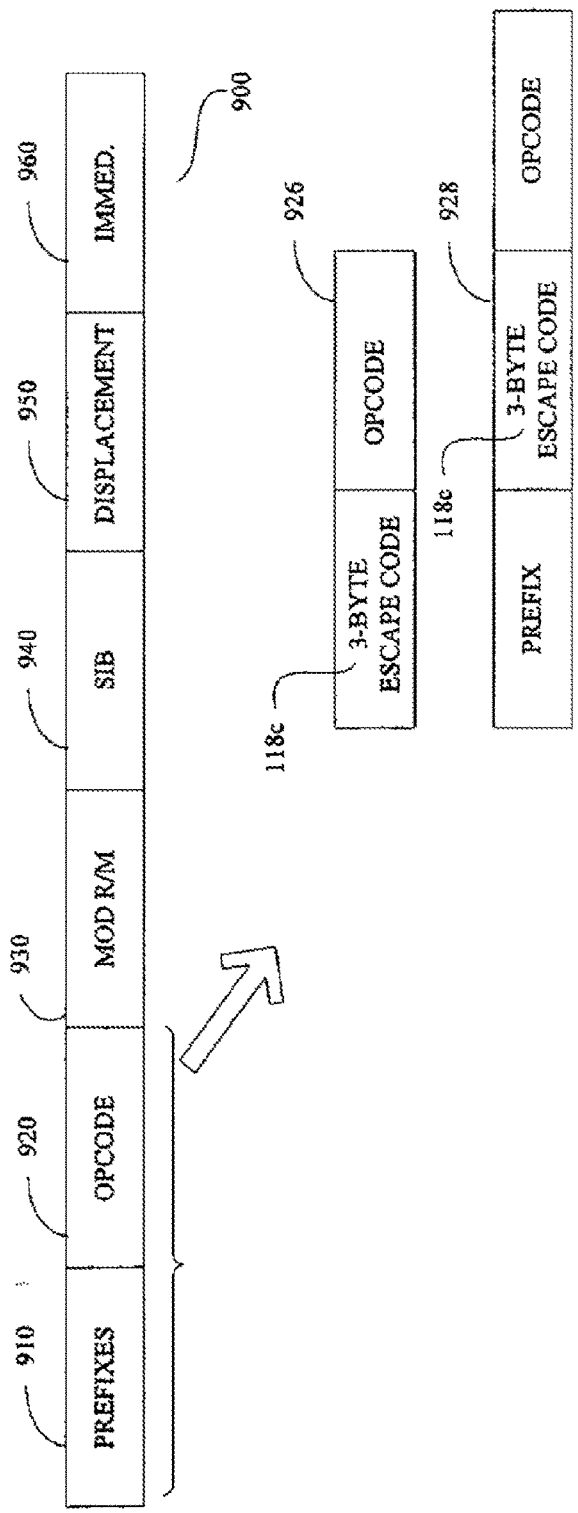
FIG. 9 is a block diagram illustrating various embodiments of operation code formats for processor instructions.

Reference to FIG. 9 illustrates various embodiments of operation codes that may be utilized to encode the control signal (operation code) for an LCSZC instruction. FIG. 9 illustrates a format of an instruction 900 according to one embodiment of the invention. The instruction format 900 includes various fields; these files may include a prefix field 910, an opcode field 920, and operand specifier fields (e.g., modR/M, scale-index-base, displacement, immediate, etc.). The operand specifier fields are optional and include a modR/M field 930, an SIB field 940, a displacement field 950, and an immediate field 960.

One skilled in the art will recognize that the format 900 set forth in FIG. 9 is illustrative, and that other organizations of data within an instruction code may be utilized with disclosed embodiments. For example, the fields 910, 920, 930, 940, 950, 960 need not be organized in the order shown, but may be re-organized into other locations with respect to each other and need not be contiguous. Also, the field lengths discussed herein should not be taken to be limiting.

A field discussed as being a particular member of bytes may, in alternative embodiments, be implemented as a larger or smaller field. Also, the term "byte," while used herein to refer to an eight-bit grouping, may in other embodiments be implemented as a grouping of any other size, including 4 bits, 16 bits, and 32 bits.

As used herein, an opcode for a specific instance of an instruction, such as an LCSZC instruction, may include certain values in the fields of the instruction format 200, in order to indicate the desired operation. Such an instruction is sometimes referred to as "an actual instruction." The bit values for an actual instruction are sometimes referred to collectively herein as an "instruction code."

For each instruction code, the corresponding decoded instruction code uniquely represents an operation to be performed by an execution unit (such as, e.g., 130 of FIG. 1a) responsive to the instruction code. The decoded instruction code may include one or more micro-operations.

The contents of the opcode field 920 specify the operation. For at least one embodiment, the opcode field 920 for the embodiments of the LCSZC instructions discussed herein is three bytes in length. The opcode field 920 may include one, two or three bytes of information. For at least one embodiment, a three-byte escape opcode value in a two-byte escape field 118c of the opcode field 920 is combined with the contents of a third byte 925 of the opcode field 920 to specify an LCSZC operation. This third byte 925 is referenced to herein as an instruction-specific opcode.

FIG. 9 illustrates that, for a second embodiment 928 of an instruction format for an LCSZC instruction, the three-byte escape opcode value in the two-byte field 118c of the opcode field 920 is combined with the contents of the prefix field 910 and the contents of the instruction-specific opcode field 925 of the opcode field 920 to specify an LCSZC operation.

For at least one embodiment, the prefix value 0x66 is placed in the prefix field 910 and is used as part of the instruction opcode to define the desired operation. That is, the value in the prefix 910 field is decoded as part of the opcode, rather than being construed to merely qualify the opcode that follows. For at least one embodiment, for example, the prefix value 0x66 is utilized to indicate that the destination and source operands of an LCSZC instruction reside in 128-bit Intel® SSE2 XMM registers. Other prefixes can be similarly used. However, for at least some embodiments of the LCSZC instructions, a prefix may instead be used in the traditional role of enhancing the opcode or qualifying the opcode under some operational condition.

A first embodiment 926 and a second embodiment 928 of an instruction format both include a 3-byte escape opcode field 118c and an instruction-specific opcode field 925. The 3-byte escape opcode field 118c is, for at least one embodiment, two bytes in length. The instruction format 926 uses one of four special escape opcodes, called three-byte escape opcodes. The three-byte escape opcodes are two bytes in length, and they indicate to decoder hardware that the instruction utilizes a third byte in the opcode field 920 to define the instruction. The 3-byte escape opcode field 118c may lie anywhere within the instruction opcode and need not necessarily be the highest-order or lowest-order field within the instruction.

For at least one embodiment, at least four three-byte escape opcode values are defined:0x0F3y, where y is 0x8, 0x9, 0xA or 0xB. While certain embodiments of LCSZC instruction opcodes are disclosed herein as including the value "0x0F38" as the three-byte escape opcode value, such disclosure should not taken to be limiting. Other embodiments may utilize other escape opcode values.

Table 3 below, sets forth examples of LCSZC instruction codes using prefixes and three-byte escape opcodes.

TABLE 3

| Instruction | Definition |
| --- | --- |
| PTEST xmm1, mxx2/m128 | Compare all bits in source 128-bit register or 128-bit memory with 128-bit destination in register; set ZF if xmm2/m128 AND xmm1 is all zeros; otherwise clear ZF. Set CF if xmm2/m128 AND NOT xmm1 result is all zeros; otherwise clear CF. |
| TESTPS xmm1, xmm2/m128 | Compare MSB for each of four packed doublewords in source (128-bit register or 128-bit memory) with corresponding MSB for each of four packed doublewords in destination (128-bit register); set ZF if MSB (bits 127, 95, 63 and 31) of xmm2/m128 AND xmm1 is all zeros; otherwise clear ZF. Set CF if MSB (bits 127, 95, 63 and 31) xmm2/m128 AND NOT xmm1 result is all zeros; otherwise clear CF. |
| TESTPD xmm1, xmm2/m128 | Compare MSB for each of two packed quadwords in source (128-bit register or 128-bit memory) with corresponding MSB for each of two packed quadwords in destination (128-bit register); set ZF if MSB (bits 127 and 63) of xmm2/m128 AND xmm1 is all zeros; otherwise clear ZF. Set CF if MSB (bits 127 and 63) of xmm2/m128 AND NOT xmm1 result is all zeros; otherwise clear CF. |

For at least one embodiment, the value in the source or destination operand may be utilized as a mask. The programmer's choice regarding whether to use the source or destination operand as the mask value may be driven, at least in part, by the desired behavior. For example, using the second operand (source) as the mask value, the resultant behavior may be stated as: "If everything under the makes is "0", set ZF; if everything under the mask is "1", set CF." On the other hand, when using the first argument (destination) as the mask value, the resultant behavior may be stated as: "If everything under the mask is "0", set ZF; if everything under the mask is "0", set CF."

To perform the equivalent of at least some embodiments of the packed LCSZC instructions discussed above in connection with FIGS. 7c, 7d, 8b and 8c, additional instructions are needed, which adds machine cycle latency to the operation. For example, the pseudocode set forth in Table 4, below, illustrates the savings in instructions using a PTEST instruction versus an instruction set that does not include the PTEST instruction.

TABLE 4

| PTEST instruction - | No PTEST Instruction - |
| --- | --- |
| movdqa xmm0, _x[eax] | movdqa xmm0, _x[eax] |
| pcmpeqd xmm0, | pcmpeqd xmm0, |
| const_0000000100000001000000010000001 | const 0000000100000001000000010000001 |
| PTEST xmm0, xmm0 | pmovmskb eax, xmm0 |

TABLE 4-continued

| PTEST instruction - | No PTEST Instruction - |
|---|---|
| Jz all_under_mask_zero | Test eax, eax<br>Jz all_under_mask_zero |

The pseudocode set forth in Table 4 helps to illustrate that the described embodiments of the LCSZC instruction can be used to improve the performance of software code. As a result, the LCSZC instruction can be used in a general purpose processor to improve the performance of a greater number algorithms than the described prior art instructions.

Alternative Embodiments

While the described embodiments use comparisons of the MSB for 32-bit data elements and 64-bit data elements for the packed embodiments of the LCSZC instructions, alternative embodiments may use different sized inputs, different-sized data elements, and/or comparison of different bits (e.g., the LSB of the data elements). In addition, while in some described embodiments Source1 and Dest each contain 128-bits of data, alternative embodiment could operate on packed data having more or less data. For example, one alternative embodiment operates on packed data having 64-bits of data. Also, the bits compared by the LCSZC instruction need not necessarily represent the same respective bit position for each of the packed data elements.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

The above description is intended to illustrate preferred embodiments of the present invention. From the discussion above it should also be apparent that especially in such an area of technology, where growth is fast and further advancements are not easily foreseen, the invention may be modified in arrangement and detail by those skilled in the art without departing from the principles of the present invention within the scope of the accompanying claims.

What is claimed is:

1. A processor, comprising:
a cache to store instructions;
an instruction decoder to decode the instructions;
a set of 128-bit packed data registers to store packed data elements and packed integer data elements;
an execution unit comprising:
comparison circuitry to execute a packed instruction to:
compare a first packed data element and a second packed data element and to responsively set at least one bit in a register to indicate a result of the packed comparison;
compare a first packed integer data element and a second packed integer data element and to responsively set the at least one bit in the register to indicate a result of the packed integer comparison; and
determine a target code location based on the at least one bit set in the register.

2. The processor of claim 1 wherein the set of 128-bit packed data registers comprises at least one set of physical registers for storing both scalar floating-point values and vector data elements.

3. The processor of claim 1 further comprising:
instruction fetch circuitry to fetch the instructions.

4. The processor of claim 1 further comprising:
a memory interface to couple the processor to a system memory.

5. The processor of claim 1 further comprising:
a co-processor interface to couple the processor to one or more external processors.

6. The processor of claim 1 further comprising:
a data storage interface to couple the processor to a data storage device.

7. A non-transitory machine-readable medium having program code stored thereon which, when executed by a machine, causes the machine to perform the operations of:
storing instruction in a cache;
decoding the instructions;
storing packed data elements and packed integer data elements in a set of 128-bit packed data registers;
executing a packed instruction to:
compare a first packed data element and a second packed data element and responsively setting at least one bit in a register to indicate a result of the packed comparison;
compare a first packed integer data element and a second packed integer data element and responsively setting the at least one bit in the register to indicate a result of the packed integer comparison; and
determine a target code location based on the at least one bit set in the register.

8. The non-transitory machine-readable medium of claim 7 wherein the set of 128-bit packed data registers comprises at least one set of physical registers for storing both scalar floating-point values and vector data elements.

9. A method comprising:
storing instruction in a cache;
decoding the instructions;
storing packed data elements and packed integer data elements in a set of 128-bit packed data registers;
executing a packed instruction to:
compare a first packed data element and a second packed data element and responsively setting at least one bit in a register to indicate a result of the packed comparison;
compare a first packed integer data element and a second packed integer data element and responsively setting the at least one bit in the register to indicate a result of the packed integer comparison; and
determine a target code location based on the at least one bit set in the register.

10. The method of claim 9 wherein the set of 128-bit packed data registers comprises at least one set of physical registers for storing both scalar floating-point values and vector data elements.

* * * * *